US009177023B2

(12) United States Patent
Graefe et al.

(10) Patent No.: US 9,177,023 B2
(45) Date of Patent: Nov. 3, 2015

(54) EVALUATION OF DATABASE QUERY PLAN ROBUSTNESS LANDMARKS USING OPERATOR MAPS OR QUERY MAPS

(75) Inventors: Goetz Graefe, Madison, WI (US);
Harumi Kuno, Cupertino, CA (US);
Janet L. Wiener, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1662 days.

(21) Appl. No.: 12/364,063

(22) Filed: Feb. 2, 2009

(65) Prior Publication Data

US 2010/0198810 A1 Aug. 5, 2010

(51) Int. Cl.
*G06F 17/30* (2006.01)

(52) U.S. Cl.
CPC ................................ *G06F 17/30463* (2013.01)

(58) Field of Classification Search
CPC ................................................ G06F 17/30463
USPC .......................................................... 707/765
See application file for complete search history.

(56) References Cited

U.S. PATENT DOCUMENTS

| | | | | |
|---|---|---|---|---|
| 5,412,806 A | * | 5/1995 | Du et al. .................................. | 1/1 |
| 5,956,706 A | * | 9/1999 | Carey et al. ............................ | 1/1 |
| 6,088,691 A | * | 7/2000 | Bhargava et al. ................. | 707/714 |
| 2002/0103793 A1 | * | 8/2002 | Koller et al. ........................ | 707/3 |
| 2002/0198867 A1 | * | 12/2002 | Lohman et al. ..................... | 707/3 |
| 2003/0177137 A1 | | 9/2003 | MacLeod et al. | |
| 2004/0215626 A1 | * | 10/2004 | Colossi et al. ................. | 707/100 |
| 2005/0222965 A1 | | 10/2005 | Chaudhuri et al. | |
| 2006/0190310 A1 | | 8/2006 | Gudla et al. | |
| 2006/0195416 A1 | * | 8/2006 | Ewen et al. ........................ | 707/2 |
| 2006/0200451 A1 | | 9/2006 | Kosuru et al. | |
| 2007/0143246 A1 | | 6/2007 | Bestgen et al. | |
| 2008/0052266 A1 | * | 2/2008 | Goldstein et al. .................. | 707/2 |
| 2008/0133454 A1 | * | 6/2008 | Markl et al. ........................ | 707/2 |
| 2008/0195577 A1 | * | 8/2008 | Fan et al. ........................... | 707/2 |
| 2008/0222093 A1 | * | 9/2008 | Fan et al. ........................... | 707/2 |
| 2009/0327254 A1 | * | 12/2009 | Bruno et al. ....................... | 707/4 |
| 2010/0082507 A1 | * | 4/2010 | Ganapathi et al. .............. | 706/12 |
| 2010/0082602 A1 | * | 4/2010 | Ganapathi et al. ............ | 707/718 |

* cited by examiner

*Primary Examiner* — James Trujillo
*Assistant Examiner* — Kurt Mueller
(74) *Attorney, Agent, or Firm* — Michael A. Dryja

(57) ABSTRACT

Computer-implemented systems and associated operating methods create and use an operator map to identify and evaluate database query plan robustness landmarks. The computer-implemented system comprises logic that creates a map evaluating performance of an implementation of a database engine operator during execution under actual operating conditions. The logic measures and maps performance for a selected range of runtime conditions including resource availability and data characteristics.

15 Claims, 21 Drawing Sheets

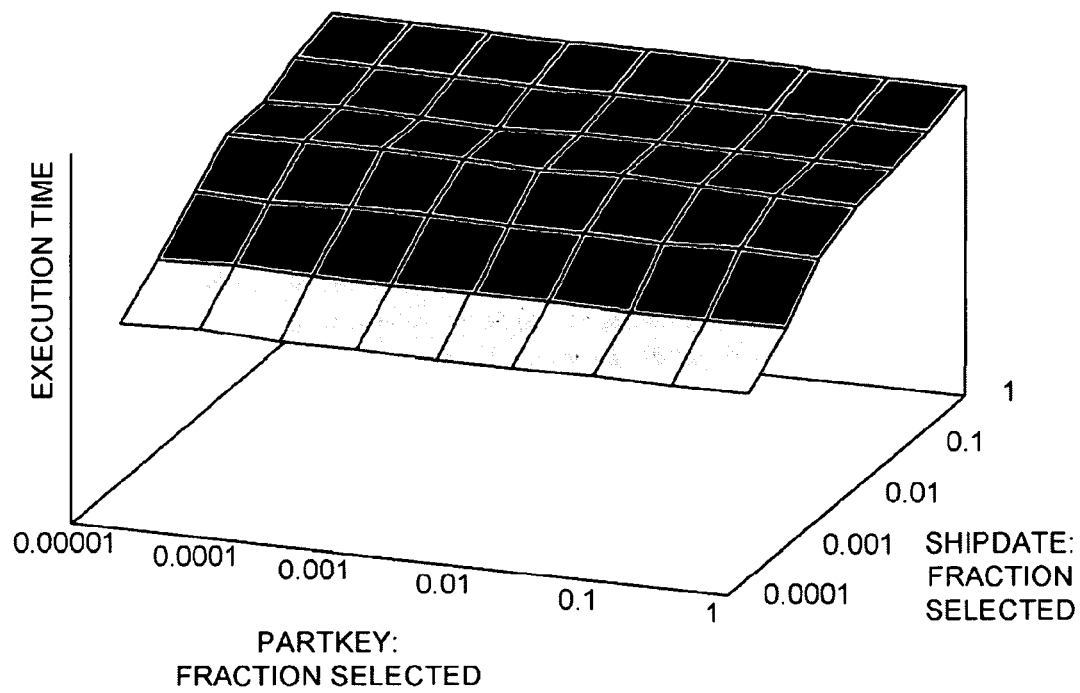
FIG. 4K(1)
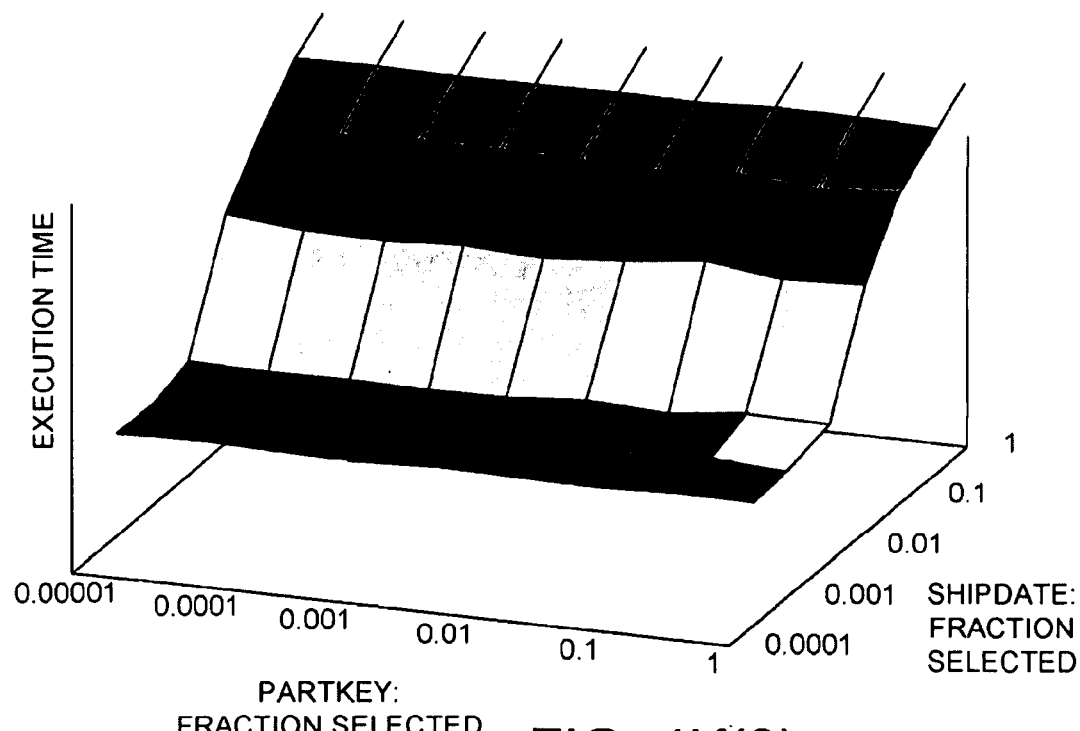
FIG. 4K(2)

| MAP ID | LANDMARK IDENTIFIER | RESOURCE COORDINATE | DATA COORDINATE | OPERATOR | PERFORMANCE | EXPECTED PROBABILITY |
|---|---|---|---|---|---|---|
| tableScan memory input | Cliff-000 | Avg. available memory: 10-32 GB | Input size: 210 GB | Table Scan | 2300 rows/sec | Expected |
| INLJ CPU, Input Selectivity | Sinkhole-001 | Avg. CPU load: 90% | Input size: 50,000, 2500 rows; selectivity 20% | Index Nested Loops Join | 1200 rows/sec | 10% |

FIG. 8

EVALUATION OF DATABASE QUERY PLAN ROBUSTNESS LANDMARKS USING OPERATOR MAPS OR QUERY MAPS

BACKGROUND

A query statement can be compiled into a query plan consisting of query operators. A query operator can be executed in many different ways, for example full table scans, index scans, nested loop joins, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure. The set of available query plans that are examined is formed by examining the possible combinations of different database operators (algorithm implementations), such as index scan and sequential scan, and join algorithms including sort-merge join, hash join, nested loops, and others. A search space can become very large according to complexity of the query.

Performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions.

Some approaches to managing database system performance focus on the query optimizer's ability to select an appropriate plan. Even techniques that consider the disparity between expected and actual runtime conditions focus on assisting the query optimizer to pick the best plan with regard to such disparity.

SUMMARY

Embodiments of computer-implemented systems and associated operating methods create and use an operator map to identify and evaluate database query plan robustness landmarks. The computer-implemented system comprises logic that creates a map evaluating performance of an implementation of a database engine operator during execution under actual operating conditions. The logic measures and maps performance for a selected range of runtime conditions including resource availability and data characteristics.

BRIEF DESCRIPTION OF THE DRAWINGS

Embodiments of the invention relating to both structure and method of operation may best be understood by referring to the following description and accompanying drawings:

FIGS. 4A through 4M are pictorial diagrams showing maps of performance under specific runtime conditions;

FIG. 8 is a table showing an example list of resource and data coordinates for interesting features related to a target query run on a target machine with a target plan;

DETAILED DESCRIPTION

To enable improved evaluation of query performance, embodiments of systems and associated methods are disclosed herein that enable creation of a robustness map of a database operator's performance.

The disclosed system creates a map evaluating the performance of an implementation of a database engine operator under a variety of conditions that include resource availability and data characteristics.

The disclosed system can also be used to create a set of one or more maps indicating how an individual implementation of a database operator performs under actual conditions. The maps are created by measuring and mapping performance with regard to a range of runtime conditions such as resource availability (available memory, CPU load average, etc.) and data characteristics (skew, selectivity, input size).

In one aspect of operation, a system and associated method evaluate the robustness of a given implementation of a database operator by measuring performance with regard to a range of runtime conditions such as resource availability (for example, amount of memory available) and data characteristics (skew, selectivity, input size). As an artifact, the system and method produce a set of measurements that can be displayed as a set of one or more maps, and analyze the measurements to identify landmarks, defined as features on the map indicating regions where performance of a given database operator degrades less than gracefully.

The disclosed system can also be used to create a set of one or more maps indicating how an individual database query plan performs under actual conditions. The maps are created by measuring and mapping performance with regard to a range of runtime conditions such as resource availability (available memory, CPU load average, etc.) and data characteristics (skew, selectivity, input size).

In one aspect of operation, a system and associated method evaluate the robustness of a given implementation of a database query plan by measuring performance with regard to a range of runtime conditions such as resource availability (for example, amount of memory available) and data characteristics (skew, selectivity, input size). As an artifact, the system and method produce a set of measurements that can be displayed as a set of one or more maps, and analyze the measurements to identify landmarks, defined as features on the map indicating regions where performance of a given database query plan degrades less than gracefully.

Figure 1:
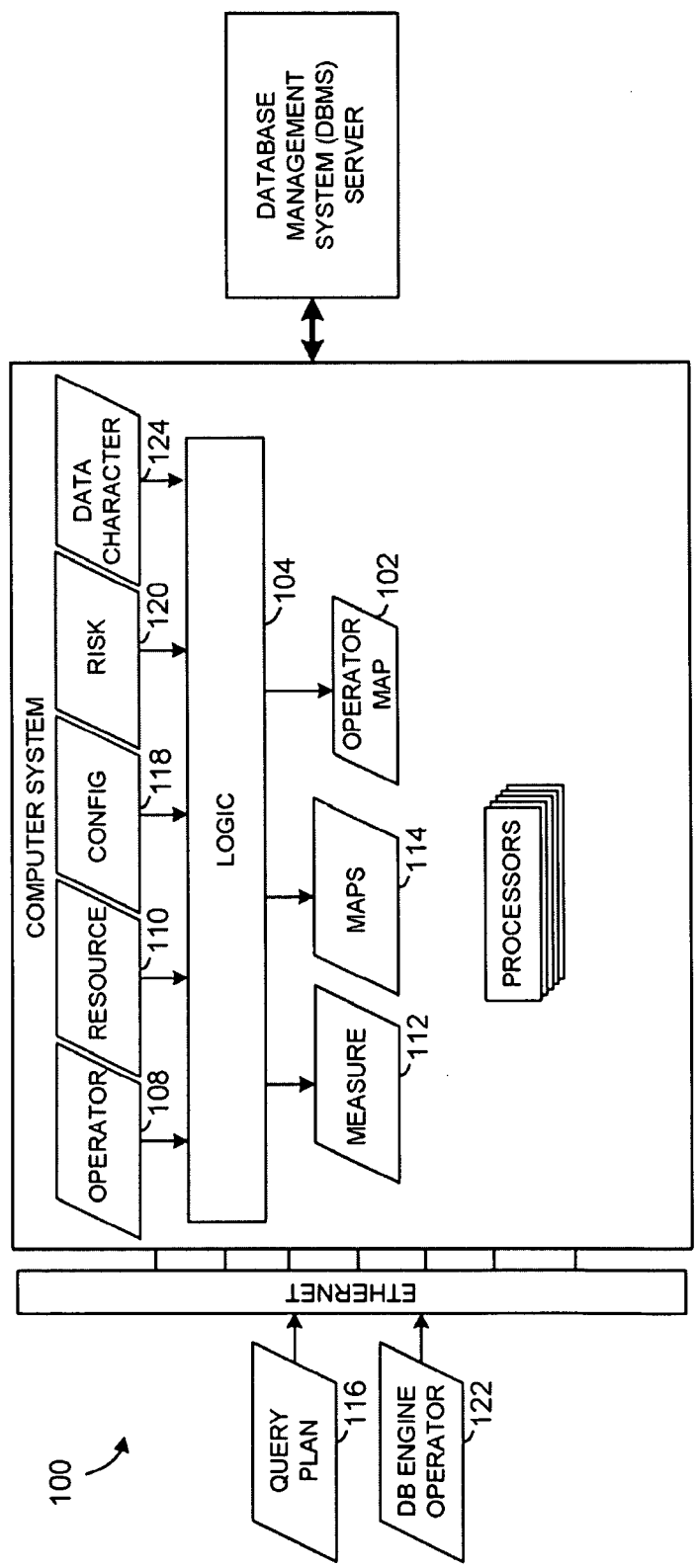
FIG. 1 is a schematic block diagram showing an embodiment of a computer-implemented system that creates and uses an operator map to identify and evaluate database query plan robustness landmarks.

Referring to FIG. 1, a schematic block diagram illustrates an embodiment of a computer-implemented system 100 that creates and uses an operator map 102 to identify and evaluate database query plan robustness landmarks. The computer-implemented system 100 comprises logic 104 that creates a performance map 102 evaluating performance of an implementation of a database engine operator 122 during execution under actual operating conditions. The logic 104 measures and maps performance for a selected range of runtime conditions including data characteristics, or in some applications or conditions, resource availability and data characteristics.

The computer-implemented system 100 can further comprise a set 108 of operator implementations to be evaluated, a set 110 of runtime resource conditions to be evaluated, and a set 124 of data characteristics. The logic 104 invokes operators and measures multiple performance characteristics for selected operator implementations and selected runtime resource conditions at multiple data characteristics. The logic creates a set 112 of performance measurements for the selected operator implementations and selected runtime conditions.

The logic 104 identifies regions in at least one performance map for which performance degrades more than a selected amount. The logic 104 can collect the identified regions, identify coordinates in the arrangement of the identified regions as landmarks, and create at least one performance map 114 that include the identified regions and coordinates.

The logic 104 accesses the one or more performance maps 114 to identify regions under which performance of a selected operator implementation degrades in manner different from a predetermined proper manner. The logic 104 analyzes the maps to identify landmarks in relation to the query plan 116 wherein query performance degrades in a predetermined manner.

In an example embodiment, the system 100 can further comprise a query plan 116, a set 118 of system configuration and contention information, and a set 120 of information quantifying risk of encountering error in cardinality estimation during usage of database operators. The logic 104 accesses, for nodes in the query plan 116, expected conditions from the set 118 of system configuration and contention information. The logic 104 then calculates data characteristics for the expected conditions and risk.

The query plan 116 and information for quantifying risk of error in cardinality estimation can be analyzed in combination since a good query plan goes together with accurate cardinality estimates. For example, cardinality estimates for single table, single column operations are usually good enough with relatively low uncertainty while cardinality estimates for multi-table and multi-column operations are often risky with high uncertainty. Risk premium-based robustness analysis recognizes the risk and uncertainty of cardinality-based cost estimates and can impose insurance risk premiums from risky operators to favor query plans that are more tolerant of cost estimation errors without unduly penalizing the runtime performance of mixed workloads of lightweight and heavyweight queries.

Risk premium-based robustness analysis can incorporate actuarial (casualty insurance) strategies into the decision-making process to mitigate risks in generated query plans. Insurance premiums can be imposed that are commensurate to the risks introduced by risky operators and plans to balance the benefits of such operators and plans against the benefits of less risky alternatives. The, the logic 104 can minimize the occurrence of catastrophically expensive query plans and improve performance predictability. The logic 104 can recognize that certain query operators such as nested join and certain query decisions such as a query's degree of parallelism are more risky than other operators and decisions.

For example, the logic 104 can select between a serial or parallel query plans based on the query's cardinality estimate. A cardinality estimate of 1000 rows may justifiably be given a serial plan, but such a serial plan is risky compared to, for example, an 8-way parallel plan. If the actual cardinality is 10 million rows, the serial plan completes in a significantly longer time in comparison to the parallel plan. In contrast, if the actual cardinality is 1000 rows or less, the 8-way parallel plan may take only marginally more time to complete than the serial plan.

"Risky operators" are query operators that are very sensitive to cardinality estimation errors. Like a good casualty insurance actuary, the logic 104 can enable a relative reward to risk analysis to significantly reduce the risks associated with optimization decisions. A risk premium can be assigned to risky operators. During plan comparison, the cost for the plan of the risky operator can be increased based on its risk premium. The logic 104 enables the query plan of the risky operator to provide a relative expected advantage over other non-risky plans, equal to or higher than the risk premium and guaranteeing that risky operators are only eliminated in situations where the expected advantage is small relative to the cost of the rest of the query. Thus, occurrence of risky query plans is significantly reduced at the expense of a small drop in the expected performance of affected queries.

The logic 104 looks up landmarks from the one or more performance maps 114 in a range of conditions and data characteristics in the set 118 of system configuration and contention information, and creates a landmark set 120 that includes landmarks and probability of complying with the conditions.

The logic 104 creates the performance map 102 that evaluates performance of an implementation of a database engine operator 122 and analyzes the maps to identify landmarks in relation to the query plan 116 based on evaluation of database operators in actual performance measurements acquired over multiple runtime conditions.

The logic 104 can also create the performance map 102 that evaluates performance of an implementation of the database engine operator 122 and analyze the maps to identify landmarks in relation to the query plan 116 based on performance tests of individual operators under data characteristics and predefined resource availability conditions. The evaluation of performance is made across a selected variety of conditions considering performance as a continuous function across the variety of conditions.

Figure 2:
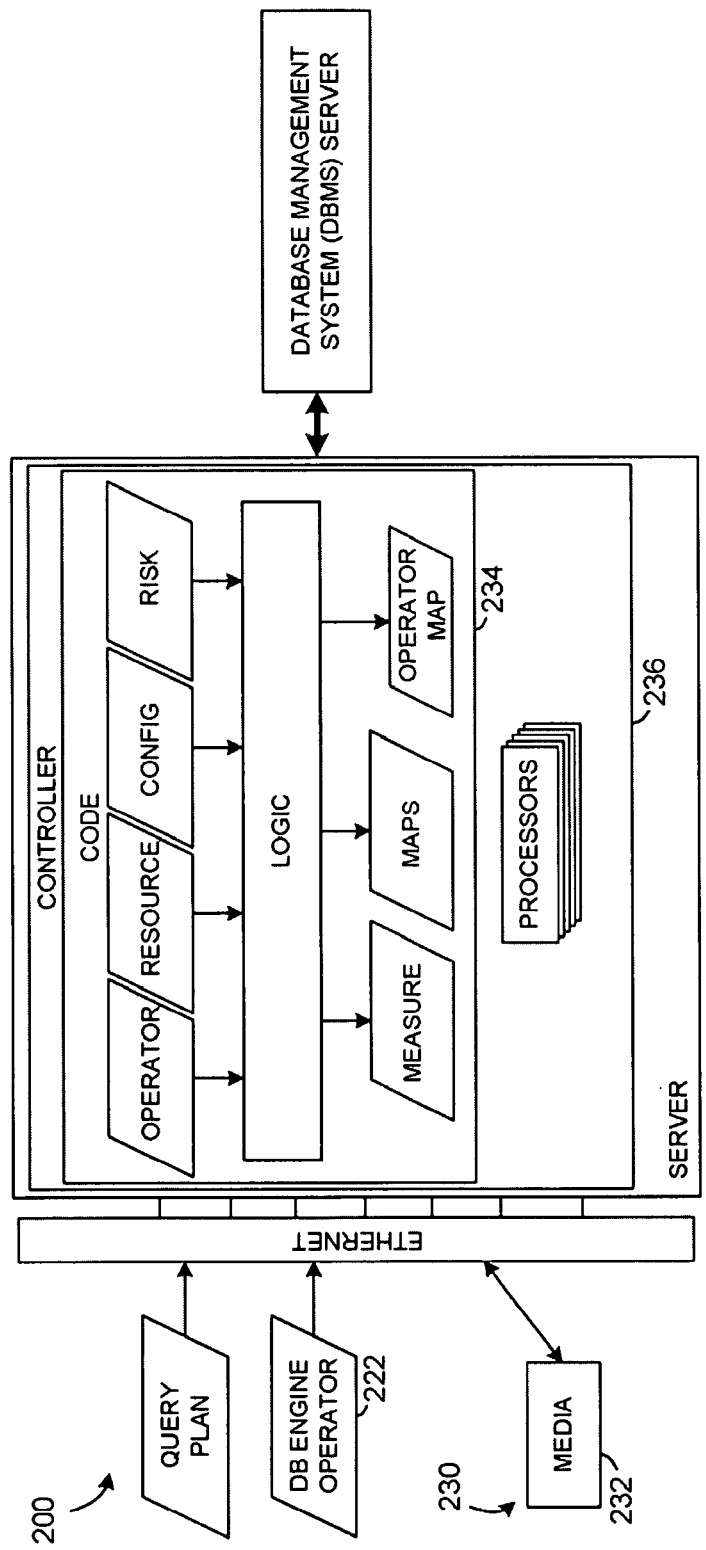
FIG. 2 is a schematic block diagram that depicts an embodiment of a computer-implemented system in the form of an article of manufacture that evaluates database query plan robustness landmarks using an operator map.

Referring to FIG. 2, a schematic block diagram illustrates an embodiment of a computer-implemented system 200 in the form of an article of manufacture 230 that creates and uses an operator map to identify and evaluate database query plan robustness landmarks. The article of manufacture 230 comprises a controller-usable medium 232 having a computer readable program code 234 embodied in a controller 236 for evaluating database query plan robustness landmarks. The computer readable program code 234 comprises code causing the controller 236 to create a performance map that evaluates performance of an implementation of a database engine operator 222 during execution under actual conditions, and code causing the controller 236 to measure and map performance for a selected range of runtime conditions comprising data characteristics or a combination of resource availability and data characteristics.

Figure 3:
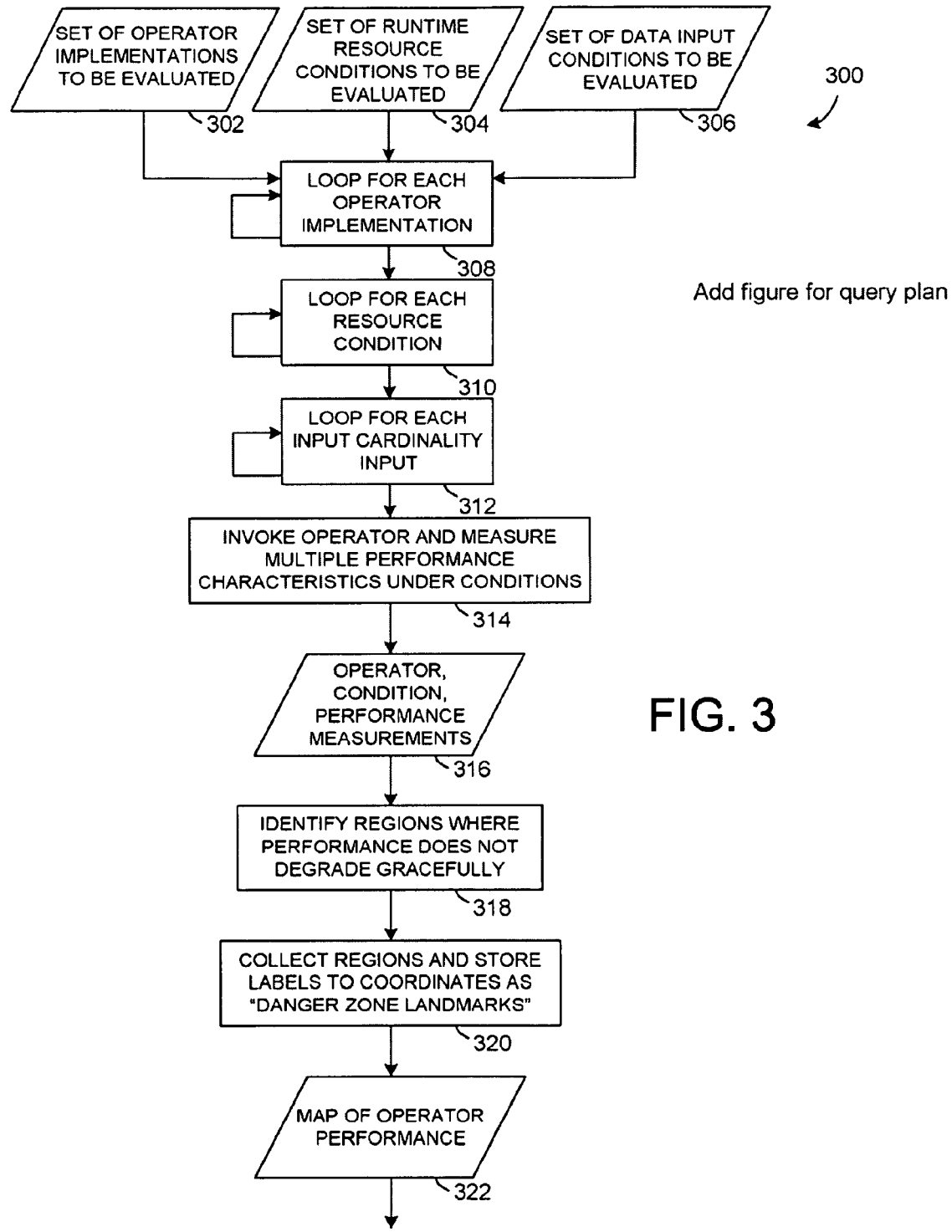
FIG. 3 is a schematic flow chart illustrating an embodiment of method for evaluating operator robustness with regard to resource suitability and data characteristics for a set of one or more input operators or set of one or more query plans.

Referring to FIG. 3, a schematic flow chart illustrates an embodiment of method 300 for evaluating operator robustness with regard to resource suitability and data characteristics for a single input operator. The method 300 is used to create a set of one or more maps that can be used to look up the performance characteristics of a given database operator implementation under a set of both runtime and data characterization conditions. Given a set 302 of database operators and operator implementations to be evaluated, and a set 304 of runtime resource conditions to be evaluated (amount of memory, CPU load, and the like), in combination with a set 306 of data input conditions (number of input rows, selectivity of a select or join predicate, presence of index, etc.), the method 300 sequences through each operator implementation 308, each resource condition 310, and each data input condition 312. The resource conditions can include amount of memory, CPU load, potential hardware configurations, and the like. For the data input conditions, the method 300 can sequence through for each data input cardinality increment 312. The cardinality increments can be adjusted from fine to coarse, for example according to the amount of memory available. As the method 300 sequences through the operator implementations 308, the resource conditions 310, and data input conditions 312, the operators can be executed 314 under the given conditions, and performance information collected and stored 316. Executing 314 the operator can comprise invoking the operator and measuring multiple performance characteristics under the imposed conditions. Performance characteristics can include average processing rate, elapsed time per tuple, and the like. The stored 316 information can include operator, condition, performance measurements to create sets that can be used for multiple applications.

The stored information can be used to identify 318 regions where performance does not degrade gracefully. The regions can be identified 318 using a selected method of quantifying continuity (such as, "smoothness vs. jagginess") across a metric space (normalized linear space). For example, the Lipschitz condition/Holder continuous functions can be used as an analysis technique. Basically, higher scores can be assigned to regions that describe gentle curves, and lower scores to regions that have steep inclines, step functions, or other dramatic "jags". FIG. 3 illustrates an example embodiment of the steps of a methodology that creates a set of maps for a number of database operators implemented by a database system. Each map depicts performance of a given database operator in a given range of conditions (such as, cardinality of the input to the operator and available memory). The method 300 can include iteration over the set of operators 308, then for each operator, iteration over the resource conditions 310. For each resource condition step 310, the method 300 can iterate 312 over data input conditions. In other implementations or applications, the iterations can be performed in a different order. For example, instead of iterating over data input conditions per resource condition step, the iteration instead can be made over resource condition steps per data input condition step.

The regions can be collected 320 and labels to the coordinates stored as "danger zone landmarks" to create 322 a map of operator performance including coordinates of "danger zone landmarks" in terms of the operator's cardinality, resource conditions, and performance map.

In another example implementation, instead of executing the operator under the given conditions and collecting actual performance measurements, instead a cost model or an emulator can be invoked to determine the operator's behavior under the specified conditions.

Figure 4A:
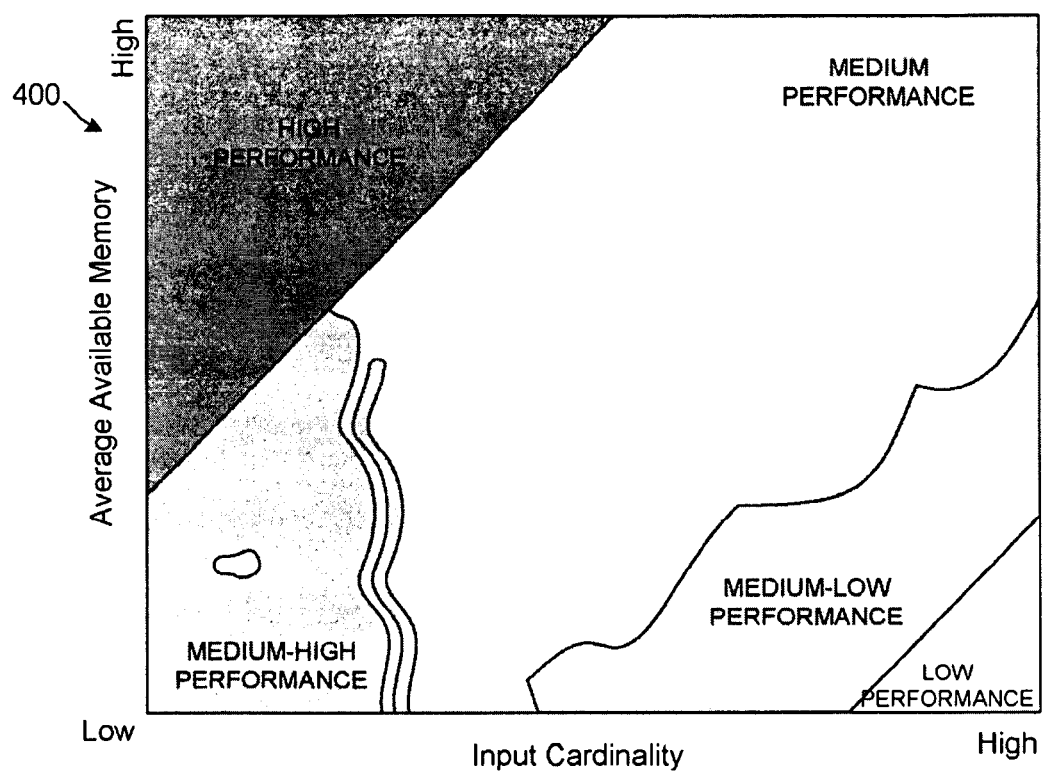

Referring to FIG. 4A, a pictorial diagram shows a hypothetical map of performance under specific runtime conditions for a database operator. In the example, FIG. 4A depicts a hypothetical map 400 of performance under specific runtime conditions for a database scan operation for one of the nodes from the target query plan. The X axis shows the number of rows of input that are processed during execution (cardinality). The Y axis represents the maximum amount of memory available to the executor for the subject query during execution. Regions of the map can be color-coded or grayscale-coded according to average throughput under their particular available memory/input tuples processed conditions. Darker colors indicate higher throughput. A similar graph can be created for conditions such as average CPU load average during the execution of the query or other parameters. Multiple graphs can be combined to show performance under multiple conditions, for example including aspects of one or more of cardinality, memory availability, CPU load average, average disk busy, and the like. A similar graph can also be created for each node in the target query plan. Any number of other visualization techniques can be applied to capture the information. In the illustrative example, a smaller rectangle marks the region of anticipated conditions under which the query is expected to execute. A larger rectangle marks a region of 10% probability.

Figure 4B:
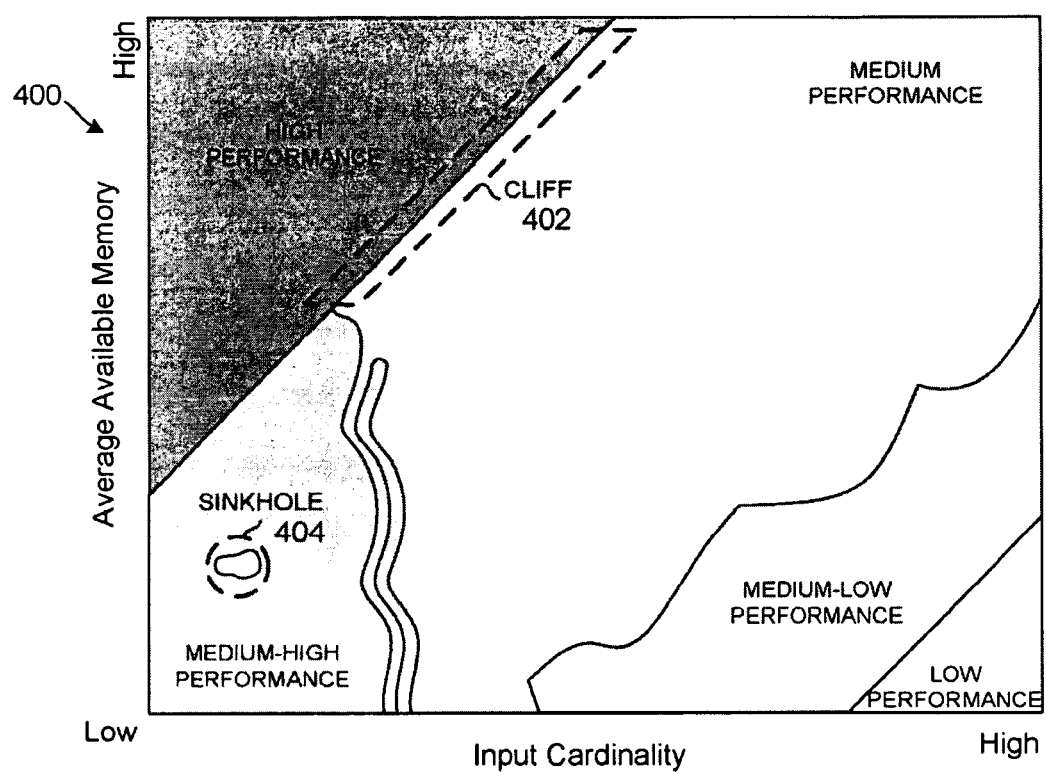

"Robustness" is defined herein as a measure of continuity of the curvature of the function describing performance under varying conditions. FIG. 4B shows how "interesting features" can be marked on the map 400. In an example application, areas of interest can be defined as areas where performance drops off precipitously. Thus, where performance does not degrade gracefully. For example, the circled area labeled "cliff" 402 shows where performance suddenly degrades when the input size of the inner input exceeds the amount of memory available. In addition, performance may be expected to be a monotonic function—for example that performance will steadily degrade as the amount of data grows and as the amount of available memory decreases. The maps can therefore also note areas where performance is not monotonic. For example, the circled area labeled "cliff" 402 notes the coordinates of an area where throughput drops off sharply. Similarly, a circled area labeled "sinkhole" 404 marks a small range of memory and input cardinality values for which throughput drops off sharply, only to resume to expected levels of throughput upon exiting the area. The robustness map 400 can accommodate any number of other types of features.

Considering that performance of a database system during processing of a query depends on the ability of a query optimizer to select an appropriate plan for executing the query under an expected set of conditions and the ability of an executor to process the query using the selected plan under actual runtime conditions, a challenge arises that actual runtime conditions can differ significantly from what is expected, particularly in situations where multiple queries execute simultaneously. For example, data skew can cause cardinality to exceed expectations by multiple orders of magnitude, or an unexpectedly heavyweight query can monopolize memory, leaving only a fraction of expected memory available. In a worst case, actual runtime conditions can be so adverse that the selected query plan can potentially be the worst, as opposed to the best, plan for the given conditions.

In addition, database operator implementations are typically tested to verify performance at specific points, as opposed to tested in terms of the continuity of performance degradation over a large range of conditions. Thus, performance can suddenly degrade dramatically and unexpectedly with only a minor change in conditions. Accordingly, the system 100 depicted in FIG. 1 and associated functionality, by creating a map of performance under a large range of conditions, enables the prediction and analysis of such performance degradation.

In another aspect of operation, the operator map can be used to identify and evaluate database query plan robustness landmarks.

Accordingly, a system and associated method use the created maps of coordinates of conditions under which the performance of given operator implementations may degrade in an unacceptable manner, and analyze the map to identify landmarks specifically relevant to a given query plan, wherein the landmarks are defined as areas in which the performance of the query's performance is likely to degrade less than gracefully.

The system can create a map that evaluates landmarks specifically relevant to a given query plan with regard to a variety of conditions including resource availability and data characteristics.

A goal of the systems depicted herein that create and use robustness maps is to enable measurement and comparison of how gracefully a database system's query architecture, operators, and implementation degrade during adverse conditions. Thus, several kinds of diagrams that we call robustness maps can be created that quantify and visualize how performance degrades as work increases or as resources decrease. Robustness maps permit reasoning about the executor's impact on query robustness. For example, robustness maps can inform regression testing as well as motivate, track, and protect improvements in query execution.

Figure 4C:
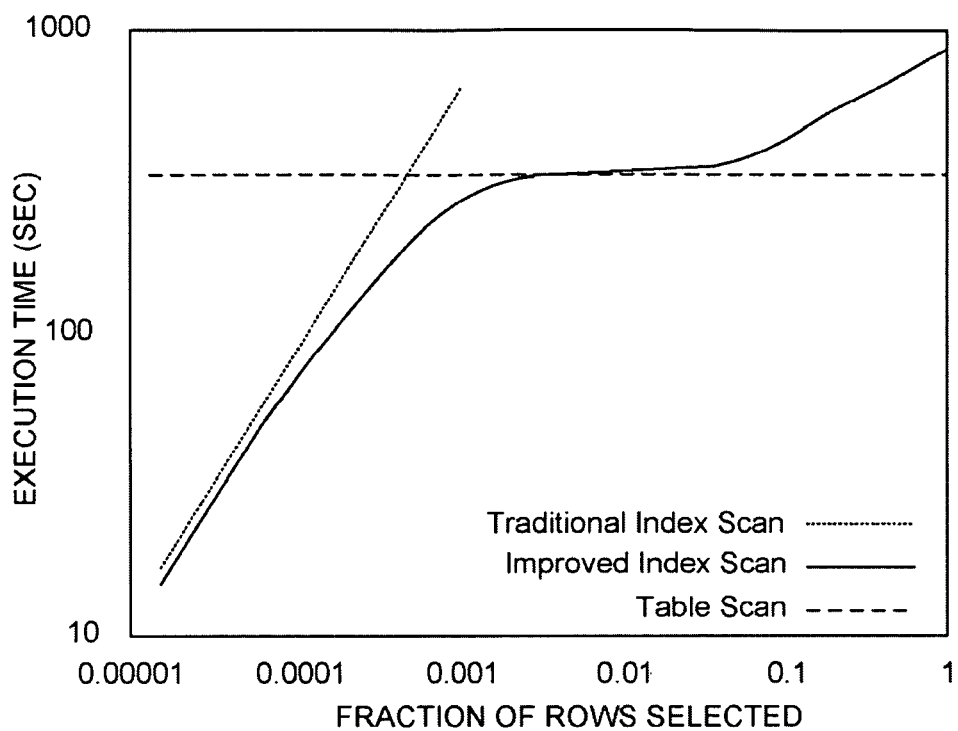

Referring to FIG. 4C, a diagram illustrates an example of a two-dimensional parameter space robustness table with single-table, single-predicate selection and shows execution times for selecting rows from a table (Transaction Processing Performance Council (TPC-H) benchmark line items, about 60 M rows) for a variety of selectivities (result sizes). Selectivities and execution times both are shown with logarithmic scales. Query result sizes differ by a factor of two between data points. FIG. 4C shows performance of three query execution planes. One plan is a traditional table scan with performance constant across the entire range of selectivities. For small result sizes, the table scan is unacceptably slow compared to the index scans. A second plan is a traditional index scan, which is unacceptably slow for moderate and large result sizes due to the need to fetch qualifying rows from the table. Cost of the index scan is so high that showing the entire range of selectivities is not possible. The break-even point between table scan and traditional index scan is at about 30K result rows or $2^{-11}$ of the rows in the table. A third plan is an improved index scan which combines low latency for small results as well as high bandwidth for moderate result sizes. The cost of the improved index scan remains competitive with the table scan all the way up to about 4 M result rows or $2^{-4}$ of the rows in the table. However, the improved index scan, despite improvement over the traditional index scan, has performance that is poor for large results. If all rows in the table satisfy the query predicate, the performance of the improved index scan is about 2½ times worse than a table scan. While a factor of 2½ is undesirable, cost is much less than cost of a traditional index scan which would exceed the cost of a table scan by multiple orders of magnitude.

An optimistic insight from FIG. 4C is that robust execution seems possible. A pessimistic insight is that the improved index scan as implemented in the system is not yet sufficiently robust. One perspective view is that a single query execution plan might eventually be superior or at least competitive across the entire range so that an erroneous choice during compile-time query optimization can be avoided by eliminating selection among alternatives. Another perspective view is that the query execution engine has not yet reached a sufficient level of sophistication and robustness. Considering the simple techniques that underlie the "improved" plan in FIG. 4C, appropriate run-time techniques can be used based on the usage of robustness maps analysis.

Although FIG. 4C can enable observations, insights, and perspective on a research effort, other visualizations enable additional insights into additional aspects of robustness and are helpful for individual operations such as index scans and for plan fragments such as scans of multiple indexes combined by index intersection. Visual images greatly assist in identifying poor scalability or robustness, discontinuities in actual execution costs, and the like. Thus, the further visualizations help in analyzing and reasoning about query execution algorithms, implementations, entire query execution plans or fragments thereof, and the query execution architecture.

The visualizations can be employed by database software vendors to target improvements in query execution, indexing techniques, and query optimization. The visualizations can be used by database administrators to analyze specific query execution plans to address unsatisfactory performance or robustness of query execution. Various visualizations have been found particularly helpful and are disclosed herein.

FIG. 4C is an example of a simple visualization of performance and robustness. One aspect of performance that can be verified by the two-dimensional diagram is that the actual execution cost is monotonic across the parameter space. For example, fetching of rows is expected to become more expensive with additional rows. If cases exist in which fetching more rows is cheaper than fetching fewer rows, some aspect of performance is anomalous. For example, the governing policy or some implementation mechanisms might be faulty in the algorithms that switch to pre-fetching large pages instead of fetching individual pages as needed. Moreover, the cost curve is expected to flatten, wherein the first derivative of the cost curve should monotonically decrease. Fetching more rows should cost more, but the difference between fetching 100 and 200 rows should not be greater than between fetching 1,000 and 1,100 rows, a condition that is not true for the improved index scan shown in FIG. 4C since the curve for the improved index scan shows a flat cost growth followed by a steeper cost growth for very large result sizes.

Figure 4D:
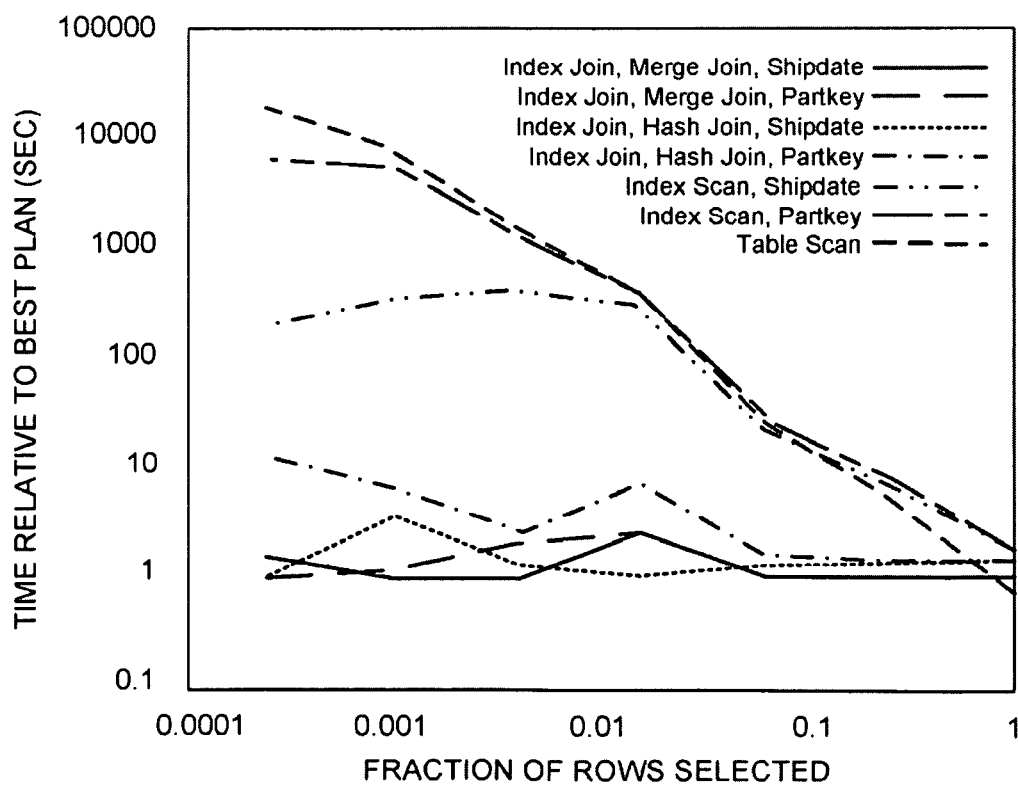

FIG. 4D is a diagram showing performance of plans for a simple query similar to the query of FIG. 4C, with two differences. First, performance is shown not in absolute times but relative to the best plan for each point in the parameter space. This type of diagram is most appropriate if the absolute performance varies very widely across the parameter space. In FIG. 4C for example, the left-most data point still represents an output size of about 900 rows (60 M$\times 2^{-16}$). Even with a logarithmic scale for query execution costs, extending the diagram all the way to one output row would increase diagram height or reduce vertical resolution by a factor of 2½.

Illustrating the relative performance of all plans may permit better resolution and better use of the space available for a diagram. Second, additional query execution plans are included, specifically multi-index plans that join non-clustered indexes such that the join result covers the query even if no single non-clustered index does. These index joins are performed by alternative join algorithms and using alternative join orders.

When comparing query execution plans for a given query, analysis includes determination of which classes of query execution plans to include such as: (1) only plans actually considered by the system under investigation; (2) plans that could be forced by some means or other including alternative syntax (for example, index intersection by means of multiple query aliases for the same database table); (3) plans that could be enabled only by an alternative database design (such as two-column indexes); or (4) plans that could be realized only with additional implementation effort by the software vendor (such as bitmap indexes, bitmap-driven sorting or intersection). Actual execution costs for the fourth class might be obtained through experiments using a competing database system that is more advanced in specific query execution techniques. The most appropriate class choice depends on whether design and future improvements of system components can be selected. For example, plans enabled by alternative syntax can considered if influence over the rewrite capabilities in the query optimization steps is available.

The diagrams can be implemented using either linear or logarithmic scales. Logarithmic scales on both axes permit reasonably detailed insight at both ends of the spectrum of possible parameter values. Curves can be formed to indicate absolute performance or performance relative to the best plan for any one point in the parameter space, where the definition for "best" might include any of the classes of query execution plans.

Robustness maps can also display performance in three-dimensional parameter spaces. Limitation to a single dimension within the parameter space both focuses and limits the insights. The interaction of dimensions can also be considered. The number of possible parameters may be very high, including multiple formal query parameters with run-time bindings; resource availability such as memory, processing bandwidth, I/O bandwidth, and interconnection bandwidth; and intermediate result sizes due to predicates (selection, joins), aggregation (projection, duplicate removal), and set operations (intersection, union, difference). Visualization practically forces consideration of two dimensions at a time and rotation through pairs of dimensions.

Figure 4E:
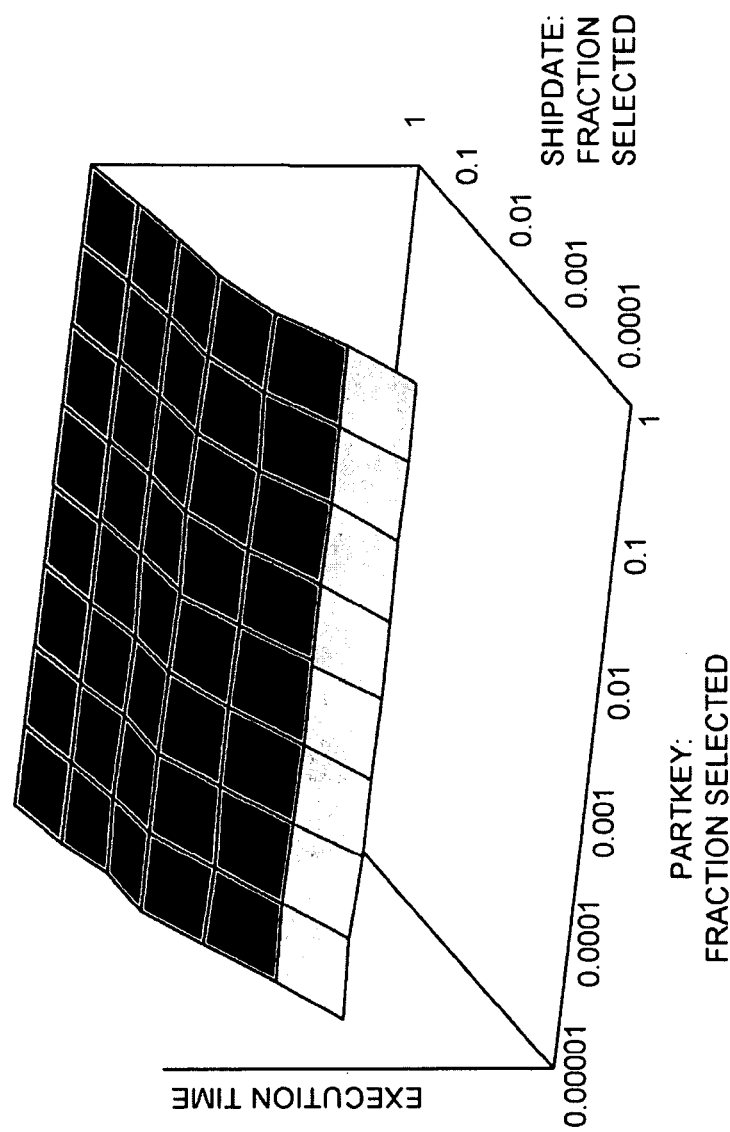

Referring to FIG. 4E, a three-dimensional map is shown which displays a parameter, illustratively execution time, in grayscale-coding or color-coding. The mapping shows elapsed times in colors or monochrome shades from green to red and finally black (light gray to black in monochrome) with each color or shade difference indicating an order of magnitude. FIG. 4E illustrates two-predicate, single-index selection, showing the execution cost for a query restricting two columns of a table. The query execution plan scans a single-column index and applies the second predicate only after fetching entire rows from the table's main storage structure. The two dimensions shown are the selectivities of the two predicate clauses. The third dimension is execution time, ranging from 4 seconds to 890 seconds.

As shown in FIG. 4E, the two dimensions have very different effects. In fact, one of the predicates appears to have practically no effect at all wherein the predicate can be evaluated only after fetching entire rows—a result which is predictable because index scans perform as expected and as coded in the cost calculations during query optimization. The actual behavior meets the anticipated behavior (reflected correctly in the cost function used during query optimization). FIG. 4E shows the robust query execution technology from FIG. 4C. While barely visible in FIG. 4E, FIG. 4C illustrates robustness very succinctly, demonstrating the value of visualizations using a combination of one-dimensional and two-dimensional parameter spaces.

Figure 4F:
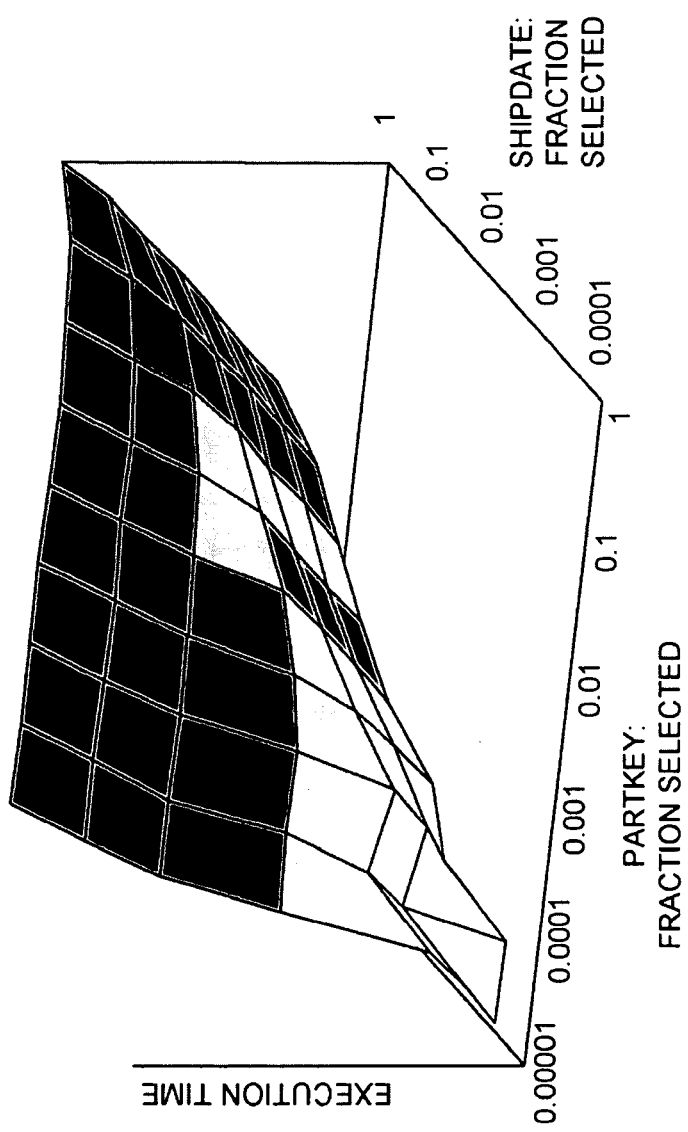

Referring to FIG. 4F, a three-dimensional diagram illustrates operation of a two-index merge join, and shows the execution cost for an alternative query execution plan, specifically scans of two single-column non-clustered indexes combined by a merge join. Other than some measurement flukes in the sub-second range (front left, green), the symmetry in the diagram indicates that the two dimensions have very similar effects. Hash join plans perform better in some cases but do not exhibit symmetry.

Figure 4G:
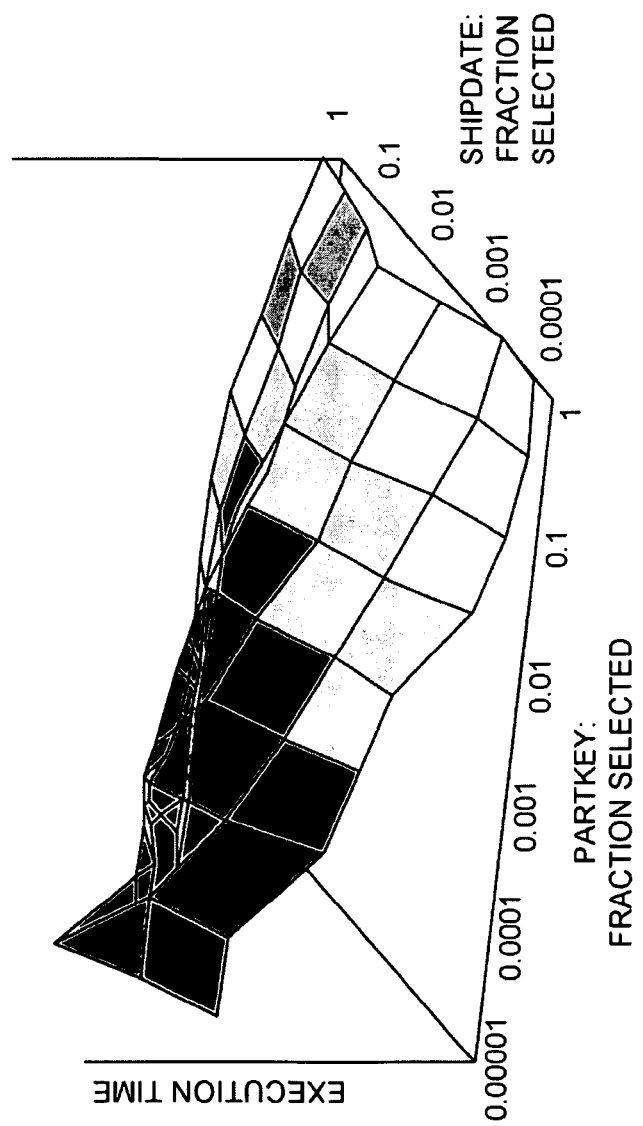

In addition to the two plans depicted in FIGS. 4E and 4F, FIG. 4G illustrates a map acquired by running five additional alternative query execution plans for the simple query. The query execution plans include a no-index table scan (actually, scanning a clustered index organized on an entirely unrelated column), a plan using a single-column non-clustered index for the other predicate clause, and three other plans combining two single-column non-clustered indexes (using merge join or hash join each in two join orders). The relative performance of each individual plan is plotted compared to the optimal plan at each point in the parameter space. A given plan is optimal if performance is equal to the optimal performance among all plans, so that the quotient of costs is 1. A plan is sub-optimal if the quotient is much higher than 1.

Referring to FIG. 4G, a three-dimensional diagram depicts performance of a single-index can relative to the best of seven plans. FIG. 4G shows the same data as FIG. 4E with performance indicated in terms of the relative difference to the best plan at each point. The diagram enables immediate recognition that the plan is optimal only in a small part of the parameter space. Moreover, the region is not continuous. While the absolute performance shown in FIG. 4E is fairly smooth, the relative performance shown in FIG. 4G is not smooth indicating that the costs of best plans are not smooth. In the example, the maximal difference is a factor of 101,000. Thus, while the plan is optimal in some regions of the parameter space, the worst relative performance is so poor that disruption of data center operation is likely.

Figure 4H:
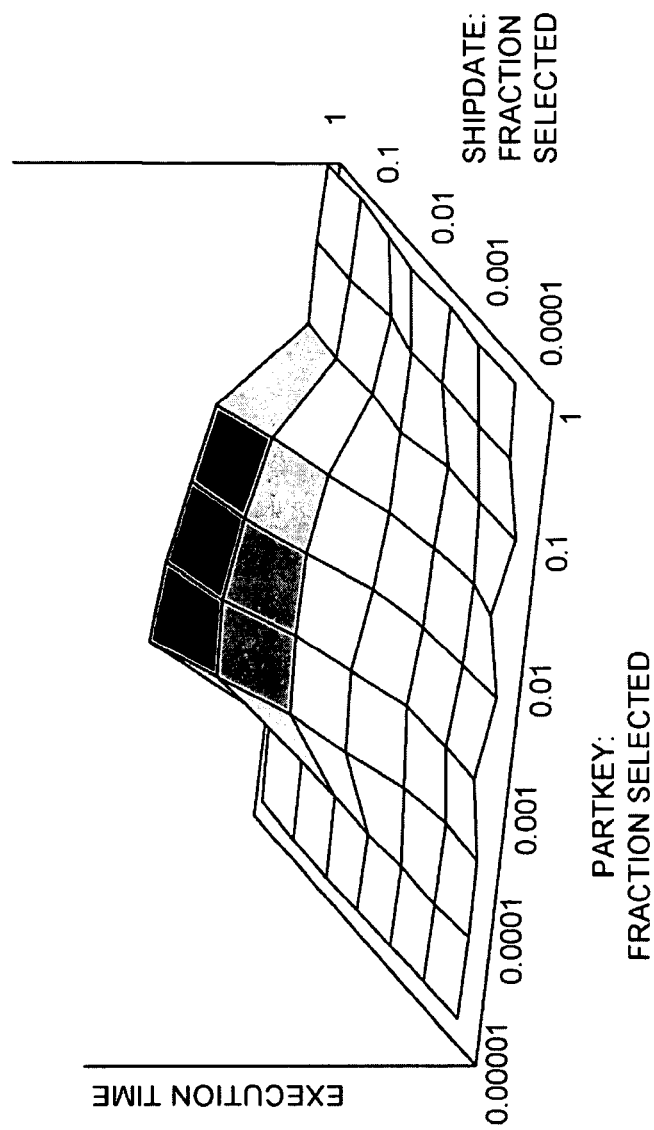

Referring to FIG. 4H, a three-dimensional diagram illustrates relative performance of a system using a two-column index, depicting the relative performance of a plan with a covering two-column index in an a software system different from that analyzed with respect to FIG. 4G. Due to multi-version concurrency control applied only to rows in the main table, the plan involves fetching full rows. In other words, the space overhead of multi-version concurrency control seems to have forced the developers of the system to apply concurrency control only to rows in the main representation of the table. Thus, the advantages of covering non-clustered indexes, including joins of multiple non-clustered indexes are disabled.

In the query execution plan, rows to be fetched are sorted very efficiently using a bitmap. The plan is close to optimal in this system over a much larger region of the parameter space. Moreover, the plan's worst quotient is not as bad as that of the prior plan shown in FIG. 4G. Thus, if the actual value of parameters is not known at compile-time, the plan is probably much more desirable even if the plans of FIG. 4E and FIG. 4F are judged more efficient at compile-time based on anticipated predicate selectivities. Thus, robustness might well trump performance in those situations.

Figure 4I:
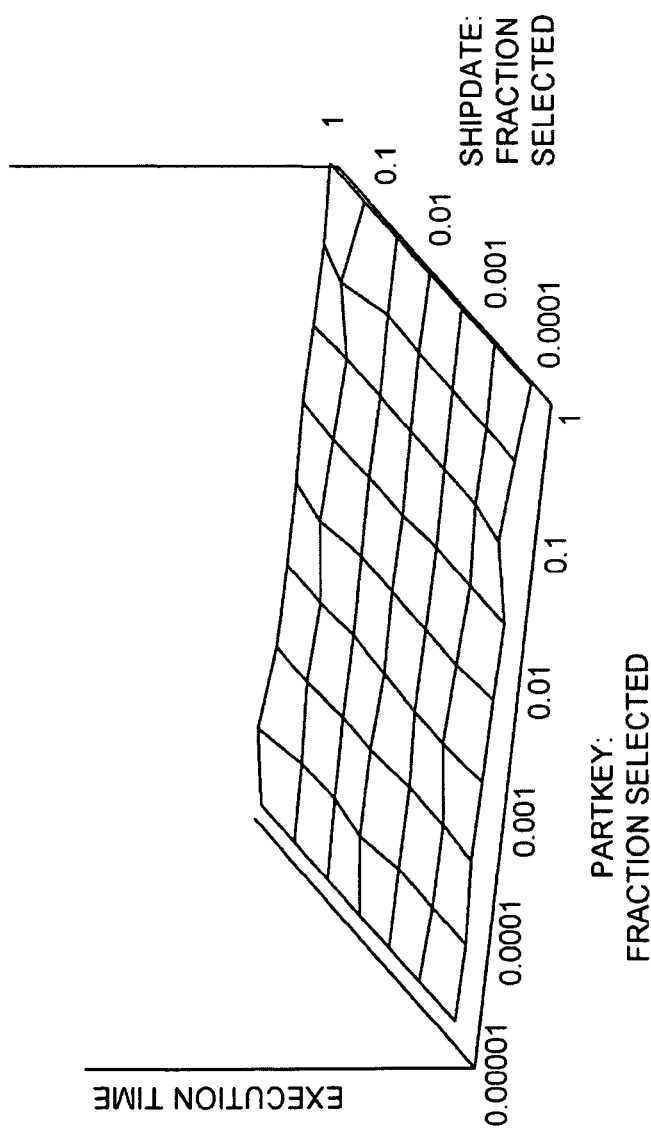

Referring to FIG. 4I, a three-dimensional robustness map shows the most robust plan in a third system. Relative performance is good across the entire parameter space, albeit not optimal. The foundation of consistent performance is a sophisticated scan for multi-column indexes described as multi-dimensional B-tree access. Data points indicate that the plan is the best query execution plan (indicated by a cost factor 1 or a light green color or light monochrome shade).

The visualization techniques employed to form the diagrams enable rapid verification of expected performance, testing of hypotheses, and insight into absolute and relative performance of alternative query execution plans. For even a very simple query, a plethora of query execution plans can be used. Investigating many plans over a parameter space with multiple dimensions is possible only with efficient visualizations.

Other robustness maps can be created to analyze other aspects of performance. For example, worst performance can be mapped to detect particularly dangerous plans and relative performance of plans compared to worst possible performance. In addition, multiple systems and available plans can be compared in combination.

Other software development activities can be performed on the basis of the visualizations. For example, a developer can focus on improving the performance of the best plan at some points deemed important within the parameter space—a traditional focus on achievable performance. Also, a developer can focus on performance of the plan with the broadest region of acceptable performance and then improve performance in the regions of the parameter space where the plan's performance is poor—a focus on robustness of a specific plan and, if that plan is chosen during query optimization, on robustness of query processing as a whole.

Another robustness map visualization is a single map showing all possible query execution plans, indicating the best plan for each point and region in the parameter space, perhaps using a color for each plan. One aspect of the map can be the size and the shape of each plan's optimality region. The regions can be continuous, simple shapes.

For query execution, analysis can focus on irregular shapes of optimality regions. Often, some implementation idiosyncrasy rather than the algorithm can cause the irregular shape. Removal of such idiosyncrasies may lead to more efficient as well as more robust query execution.

Some techniques can enlarge the largest region, possibly even eliminating some smaller regions and thus some plans from the map of optimality. Every plan eliminated from the map implies that query analysis need not consider the eliminated plan. Reducing the plan space in query analysis contributes to the robustness.

Figure 4J:
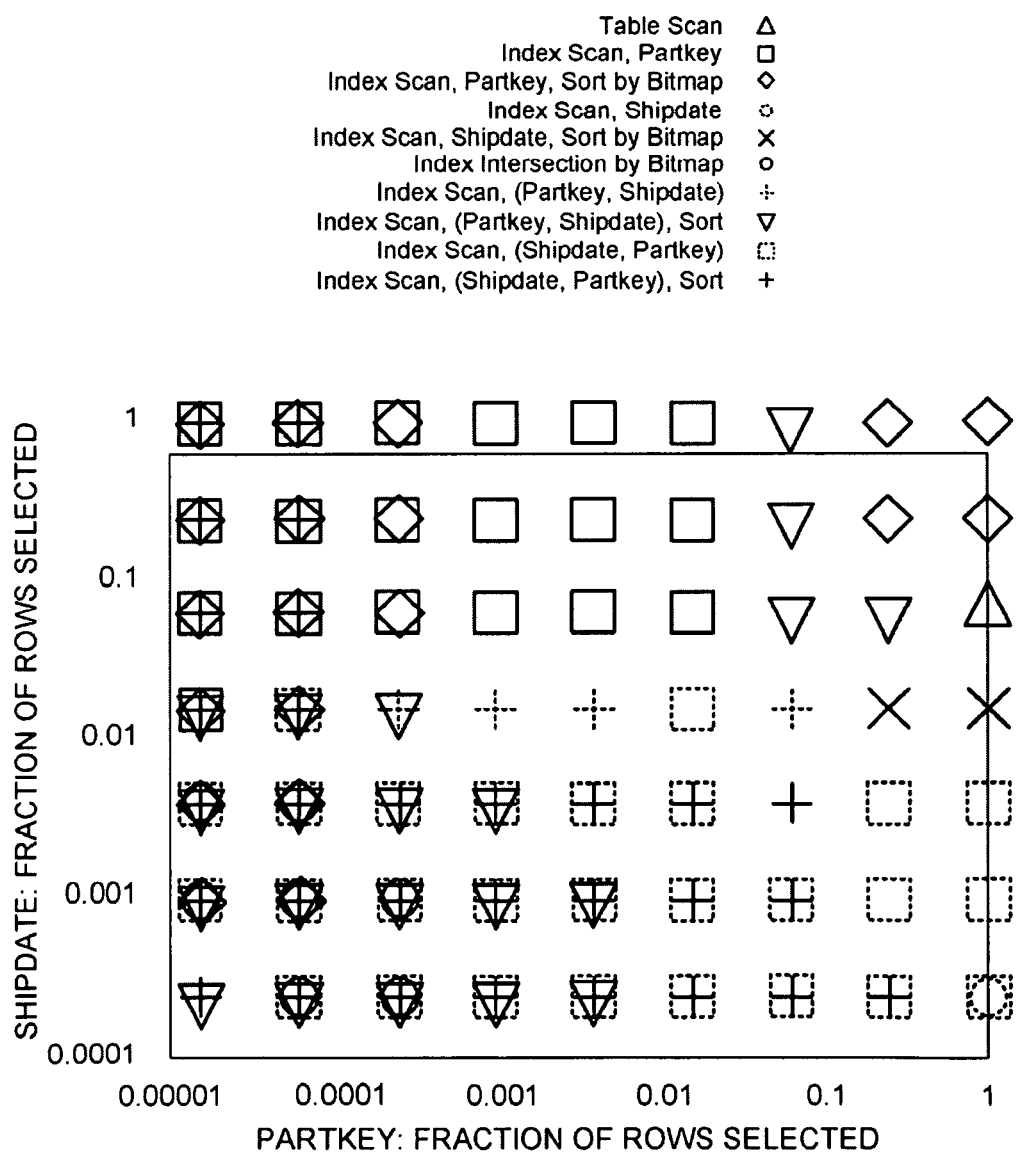

Referring to FIG. 4J, a diagram, shows mapping of regions of optimality. Most points in the parameter space have multiple optimal plans (within 0.1 sec measurement error). In fact, when analyzing optimality, all small differences should be neglected. For example, two plans with actual execution costs within 1% of each other are practically equivalent. Whether the tolerance ends at 1% difference, at 20% difference, or at a factor of 2 depends on a tradeoff between performance and robustness, and thus the tradeoff between the expense of system resources and the expense of human effort for tuning and problem resolution.

Variants of FIG. 4H and FIG. 4I can be used to show the region of optimality for a specific plan. Since the number of plans that may cover any one point in the parameter space is large, shading using two colors is typically not sufficient, but a diagram with points shaded in a large number of colors seems more confusing than illuminating. Thus, this type of diagram inherently requires one diagram per plan and thus many diagrams.

FIGS. 4K(1) and 4K(2) illustrate robustness maps for two-predicate index scan implementations. Robustness maps are designed to quantify and visualize how performance degrades as work increases and resources decrease. A plan or operator under test is fixed and performance is measured while forcing execution across a spectrum of conditions with results then plotted in a Euclidean space. The resulting shape illustrates performance degradation patterns. Slope indicates how quickly performance degrades, while curvature indicates how predictably performance degrades. Areas where the rate of performance rapidly and unpredictably drops are manifest. For example, FIGS. 4K(1) and 4K(2) compare three-dimensional robustness maps for two different implementations of a given operator, charting performance of an index scan while varying the selectivity of two predicates. Other robustness maps can be used to show how a given plan's performance compares to that of the best plan. Although only two- and three-dimensional maps are depicted herein, the technique can be used with any metric space.

Robustness maps enable analysis and reasoning about the executor's impact on query robustness. By making visible where and how performance changes, the maps show developers and regression testers the circumstances under which performance is particularly sensitive to small deviations from expected conditions. Developers can then address this sensitivity. Robustness maps thus enable a different view of performance than tests that focus on pure execution time or throughput. Robustness maps enable motivation, tracking, and protection of improvements in query execution by providing a concrete and intuitive "big picture" of the performance landscape.

The robustness map approach can be tested by building robustness maps for simple queries from the TPC-H benchmark. All database instances can be loaded with the same line item table, using the same rows (in the same order). A scale factor 10 instance of TPC-H can be used resulting, for example, in 60 M rows (6 GB). In an example analysis, five indexes are built upon the table including a default clustered index on the primary key, two single column indexes on the query predicate columns, and a pair of two-column indexes on the query predicate columns. A selected number of maps are constructed and analyzed for three systems. For example, FIGS. 4K(1,2) show that one implementation of index nested loops join is more resilient than another to variance in input data sizes, a graceful degradation that may result from the first implementation's efficient sort operation.

Figure 4L:
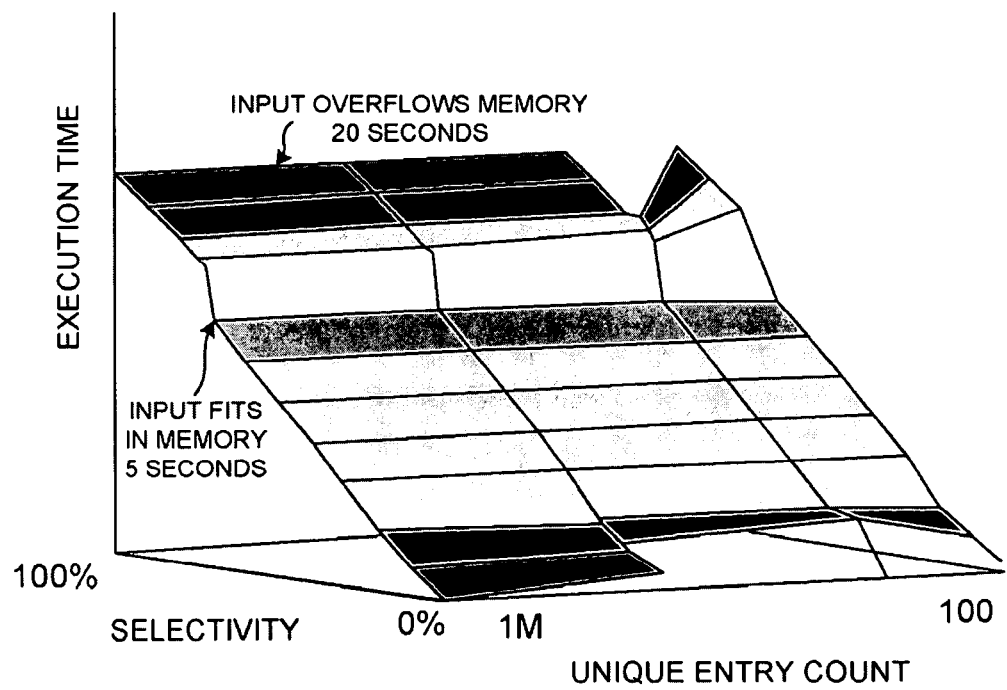

Thus robustness maps can be used to evaluate the robustness of the commercial system B sort operator. FIG. 4L shows a three-dimensional robustness map comparing the relative performance of the sort operator while varying selectivity and duplicate values. A dramatic drop in performance occurs when the data input no longer fits in memory. If estimated selectivity were one row short of the amount that would fit into memory, and the actual data size only two rows more, the sort operation would take nearly five times longer than expected.

Although such a performance drop or cliff could be considered easily anticipated, since memory availability and cardinality estimates can be checked at compile-time, when the plan is selected. However, a query optimizer bases cost estimates for a sort operation on the amount of configured memory and initial cardinality estimates, both of which are subject to significant change from compile time to run-time.

Figure 4M:
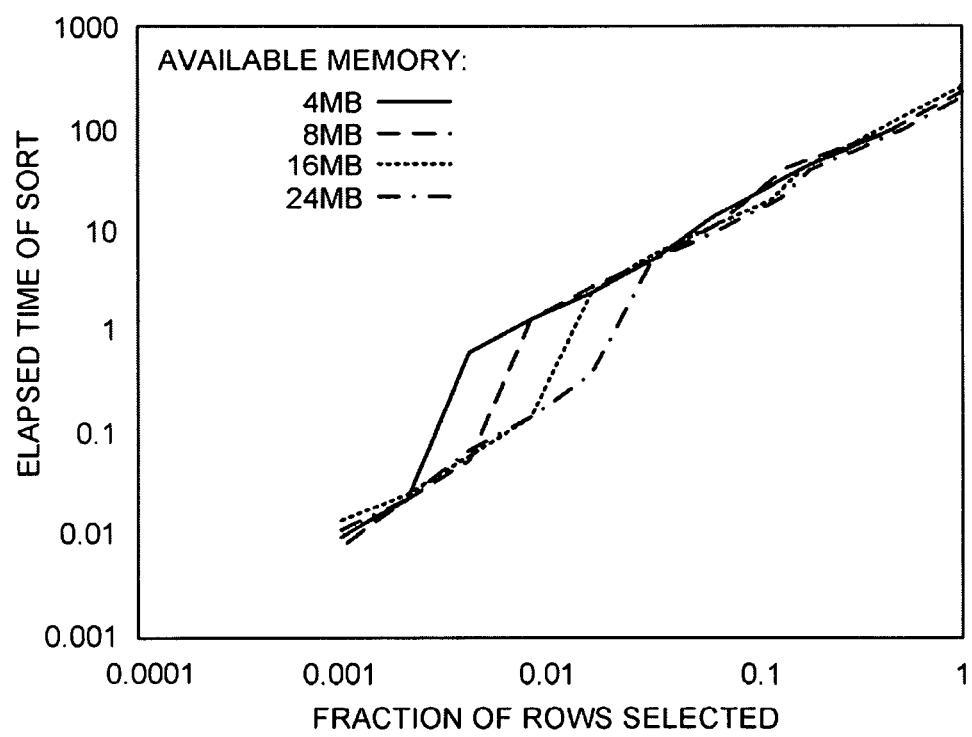

Resource contention can reduce the amount of available memory to a small fraction of that anticipated. Multiple levels of intermediate results can compound that impact. FIG. 4M maps how performance degrades as available memory decreases and shows how memory contention changes the location of the critical point where a small increase in data size causes a major drop in performance.

Run-time performance of any query plan can vary dramatically depending on execution conditions such as actual predicate selectivity and contention for memory and other resources. Execution conditions vary unpredictably, leading to the unexpectedly long-running queries that plague database users and administrators today. Thus, robust query processing reduces cost of ownership by reducing the need for human intervention.

In general, robustness in database query processing can be improved by modifications in query optimization, query execution, workload management, and other components. The systems and techniques disclosed herein focus on query execution. Robustness maps can be used to visualize performance of query execution algorithms and plan fragments, enabling understanding of behavior across a wide range of unexpected situations.

Various visualization techniques reveal different insights. Robustness maps with two- and three-dimensional parameter spaces are introduced, including discussion of robustness map interpretation, a demonstration of how to detect landmarks that appear on the maps, and a discussion of implications for robustness.

Visualizing the performance of specific algorithms, associated implementations, and plan fragments using the algorithms enables analysis of strengths and weaknesses. Adaptive techniques during run-time query execution can have as great an impact on robust query processing as plan choices during compile-time query optimization. Adaptive run-time techniques pertain to data volumes, resource availability including memory, and the specifics of the memory hierarchy.

Robustness map analysis and its visualization can be extended to additional query execution algorithms including sort, aggregation, join algorithms, and join order. For example, some implementations of sorting spill their entire input to disk if the input size exceeds the memory size by merely a single record. Those sort implementations lacking graceful degradation will show discontinuous execution costs. Other resources may introduce similar effect, such as a sort input exceeding the size of the CPU cache or the size of flash memory.

Robustness maps enable visualizations of entire query execution plans including parallel plans. A benchmark can be defined that focuses on robustness of query execution and, more generally, of query processing. The benchmark can be used to identify weaknesses in the algorithms and implementations, track progress against weaknesses, and permit daily regression testing to protect the progress against accidental regression due to other, seemingly unrelated, software changes.

Various approaches to managing database system performance can be based on the query optimizer's ability to select an appropriate plan. Even techniques that consider the disparity between expected and actual runtime conditions focus on assisting the query optimizer to pick the best plan with regard to such disparity. In contrast, an illustrative system 500 shown in FIG. 5 takes the maps produced by the system 100 shown in FIG. 1 which map coordinates of conditions under which the performance of given operator implementations may degrade in an unacceptable manner, and analyzes the maps to identify landmarks specifically relevant to a given query plan. The landmarks specify areas in which the performance of the query's performance using that plan is likely to degrade less than gracefully.

Figure 5:
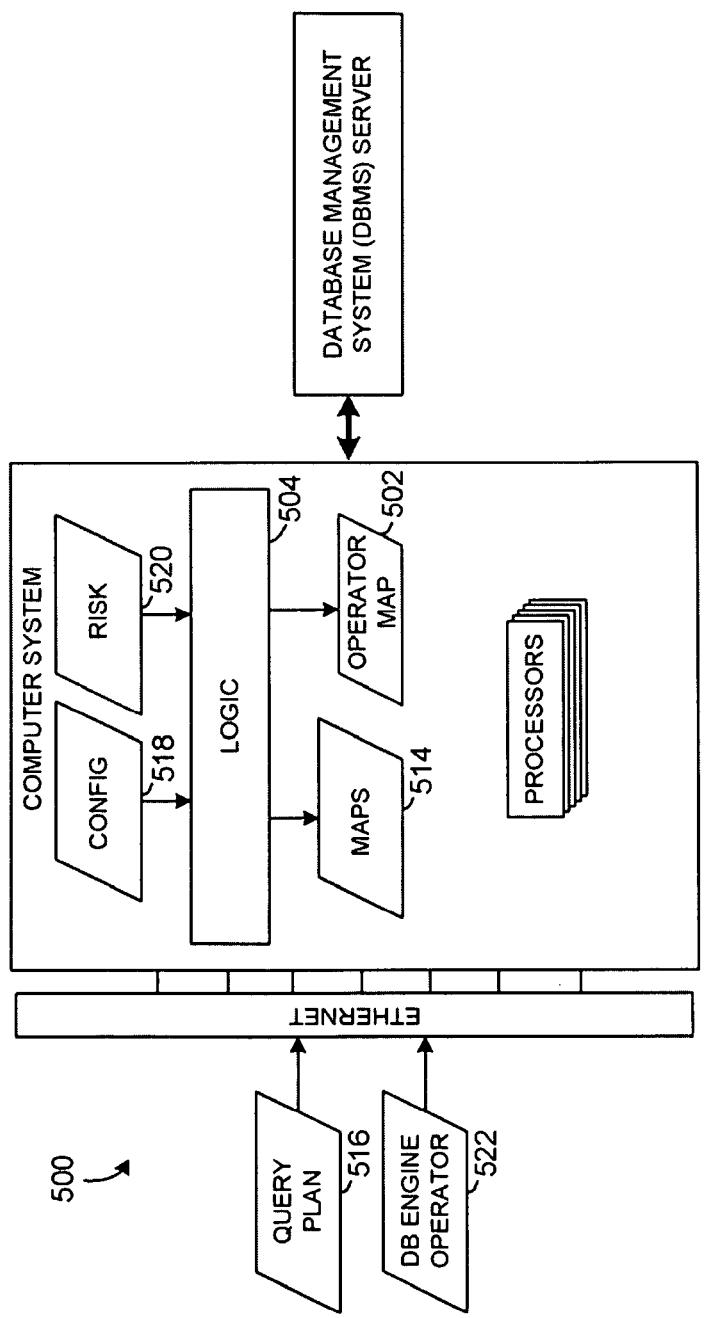
FIG. 5 is a schematic block diagram depicting an embodiment of a computer-implemented system that uses operator maps to identify and evaluate database query plan robustness landmarks.

Referring to FIG. 5, a schematic block diagram depicts an embodiment of a computer-implemented system 500 that uses operator maps 502 to identify and evaluate database query plan robustness landmarks. The system 500 comprises logic 504 that accesses at least one performance map created by acquisition during execution of an implementation of a database engine operator 522 under actual conditions. The logic 504 measures and maps performance for a selected range of runtime conditions to identify regions under which performance of a selected operator implementation degrades in a manner different from a predetermined proper manner. The logic 504 analyzes the maps to identify landmarks in relation to a selected query plan 516 wherein query performance degrades in a predetermined manner.

In an example embodiment, the system 500 can further comprise a query plan 516, a set 518 of system configuration and contention information, and a set 520 of information quantifying risk of encountering error in cardinality estimation during usage of database operators. The logic 504 accesses, for nodes in the query plan 516, expected conditions from the set 518 of system configuration and contention information. The logic 504 then calculates data characteristics for the expected conditions and risk.

The logic 504 looks up landmarks from the one or more performance maps 514 in a range of conditions and data characteristics specified in the set 518 of system configuration and contention information, and creates a landmark set 520 that includes landmarks and probability of complying with the conditions.

In contrast to the illustrative systems 100 and 500, traditional solutions do not consider the impact of variable runtime conditions, such as resource availability, and do not systematically gather actual performance measurements over a variety of runtime conditions. Furthermore, traditional solutions focus on the selection of optimal query plans for a small range expected conditions, as opposed to the evaluation of database operators under a wide variety of actual conditions.

For example, Harista et al. (U.S. Publication No. 2002/0046030) discloses a system that maps how well queries perform relative to one another in terms of estimated (expected) performance in ranges of the selectivity of a simple single-operator query with up to two parameters. Because the goal in Harista et al. is to reduce the number of plans in the query optimizer's plan search space, actual performance is not modeled and the impact of other conditions such as resource availability is not considered.

Database regression tests may test the performance of individual operators, sometimes under specific resource availability conditions, but do not evaluate performance across a spectrum of conditions and do not consider performance as a continuous function across a spectrum of conditions. Database regression tests are used to evaluate performance—results are not stored nor later used to calculate an estimate for a specific query's performance under specific conditions.

Database physical design advisors evaluate physical design search spaces, often with regard to specific query plans or atomic query plans, but the evaluations do not consider a variety of runtime conditions (for example, resource availability). Furthermore, database physical design advisor comparisons are based completely on query optimizer cost estimates, as opposed to actual performance measurements of the systems 100 and 500 depicted in FIGS. 1 and 5.

Figure 6:
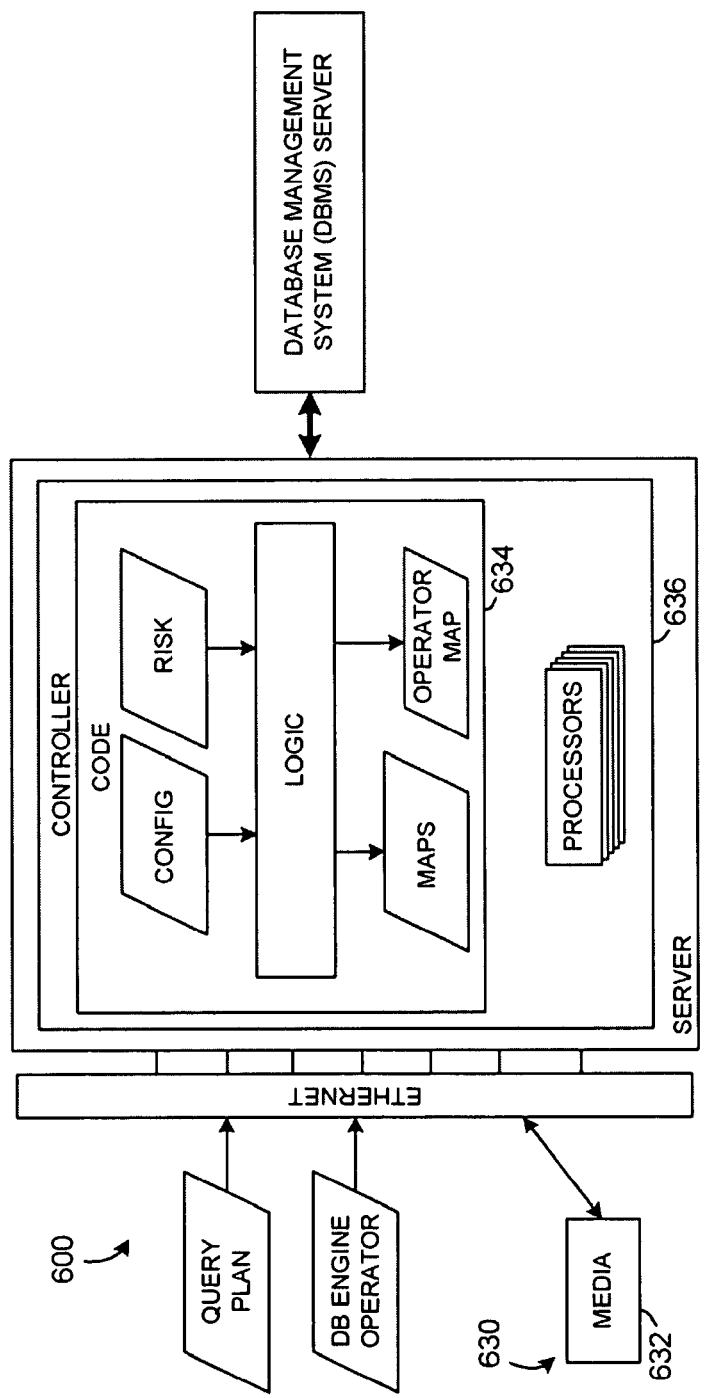
FIG. 6 is a schematic block diagram illustrating an embodiment of a computer-implemented system in the form of an article of manufacture that evaluates database query plan robustness landmarks using an operator map.

Referring to FIG. 6, a schematic block diagram illustrates an embodiment of a computer-implemented system 600 in the form of an article of manufacture 630 that evaluates database query plan robustness landmarks using an operator map. The article of manufacture 630 comprises a controller-usable medium 632 having a computer readable program code 634 embodied in a controller 636 that uses an operator map for evaluating database query plan robustness landmarks. The computer readable program code 634 comprises code causing the controller 636 to access one or more performance maps created by acquisition during execution of an implementation of a database engine operator under actual conditions, and code causing the controller 636 to measure and map performance for a selected range of runtime conditions to identify regions under which performance of a selected operator implementation degrades in a manner different from a predetermined proper manner. The computer readable program code 634 further comprises code causing the controller 636 to analyze the maps to identify landmarks in relation to a selected query plan wherein query performance degrades in a predetermined manner.

Figure 7:
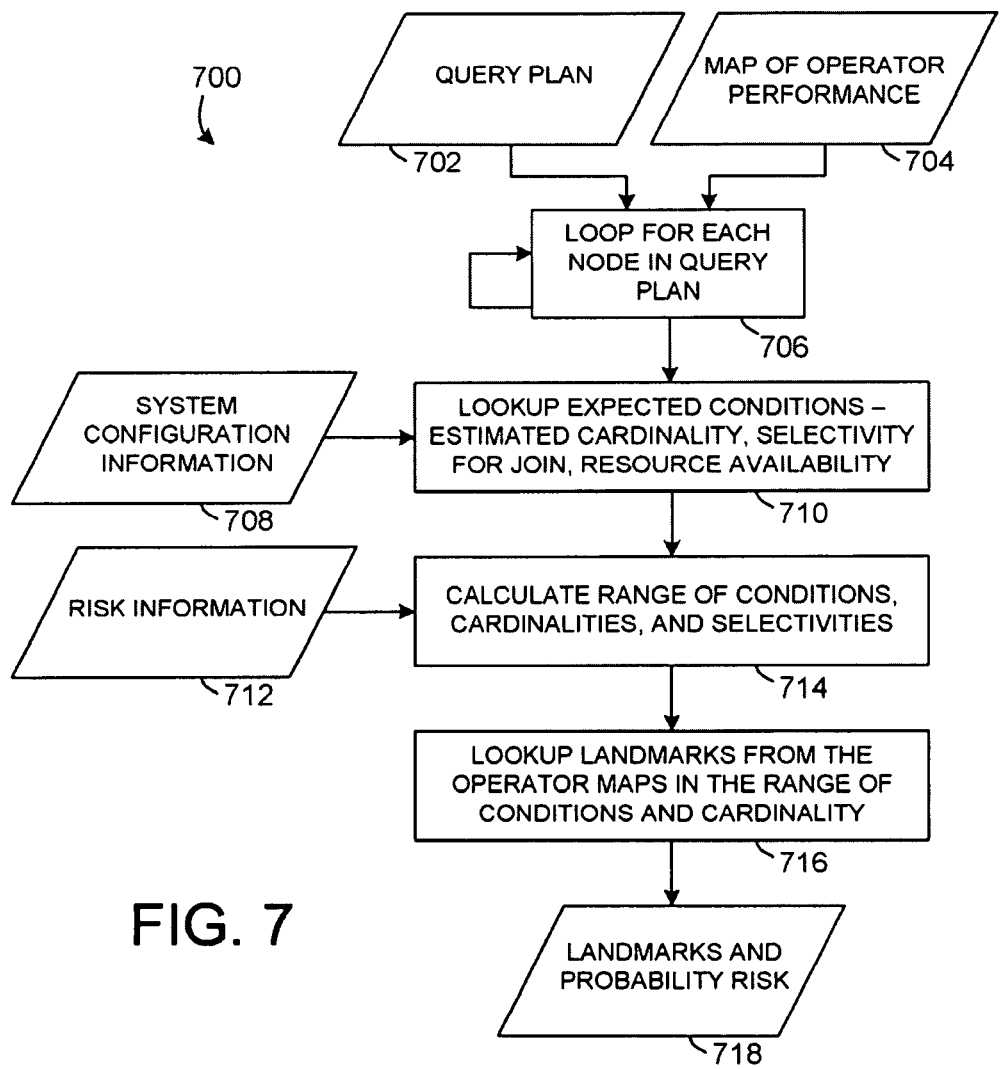
FIG. 7 is a schematic flow chart showing an embodiment of method for identifying "robustness danger zone" landmarks associated with a query plan.

Referring to FIG. 7, a schematic flow chart illustrates an embodiment of method for identifying "robustness danger zone" landmarks associated with a query plan.

The flowchart exemplifies actions of an embodiment of a system that uses the maps produced by the system 100 shown in FIG. 1 (the maps including coordinates of conditions under which the performance of given operator implementations may degrade in an unacceptable manner), and analyzes the maps to identify landmarks specifically relevant to a given query plan wherein the landmarks show conditions under which the performance of a target plan is likely to degrade less than gracefully.

Given a target query plan 702 and a set 704 of operator-specific coordinates of landmarks that associate performance conditions with ranges of resource and data conditions, the operational method 700 can begin by sequencing 706 through nodes of the query plan. The set 704 contains coordinates of "danger zone landmarks" in terms of operator's cardinality, resource conditions, and performance maps for the operators used in the Query Plan. For each node of the query plan, the range of expected conditions (data, resource conditions) under which that node's operator is expected to run is looked up 710, then the landmarks associated with conditions for that operator are looked up and recorded. The lookup 710 of expected conditions is performed by accessing system configuration information 708 including, for example, amount of memory, CPU load, potential hardware configuration, and others. Examples of expected conditions can include estimated cardinality for various base tables, estimated selectivity for join and selection predicates, expected resource availability, and the like.

Based on the lookup 710 of expected conditions and a set 712 of information setting forth risk factors, an extended range of conditions can optionally be calculated 714 and also landmarks that fall in the landmark areas can be lookup up 716 from the operator maps in the pertinent range of conditions and cardinality. The method 700 can further comprise recording 718 the probabilities of landmark occurrence along with coordinates and performance impact.

The illustrative system 500 and method 700 can explicitly evaluate performance under a wide variety of runtime conditions and enable a map to be used to "look up" the probable performance of a database query plan under a specific set of actual runtime conditions. The map can be analyzed to evaluate the continuity of the performance of a database query using a specific query plan under progressively adverse conditions. For example, while a traditional regression test can be used to identify points at which performance degrades, the map disclosed herein can be used to identify patterns of points at which performance degrades unnaturally. A set of maps can be used to rationalize the complex factors and interactions that determine the performance of a database system.

Referring to FIG. 8, a table shows an example list of resource and data coordinates for interesting features related to a target query run on a target machine with a target plan.

Figure 9:
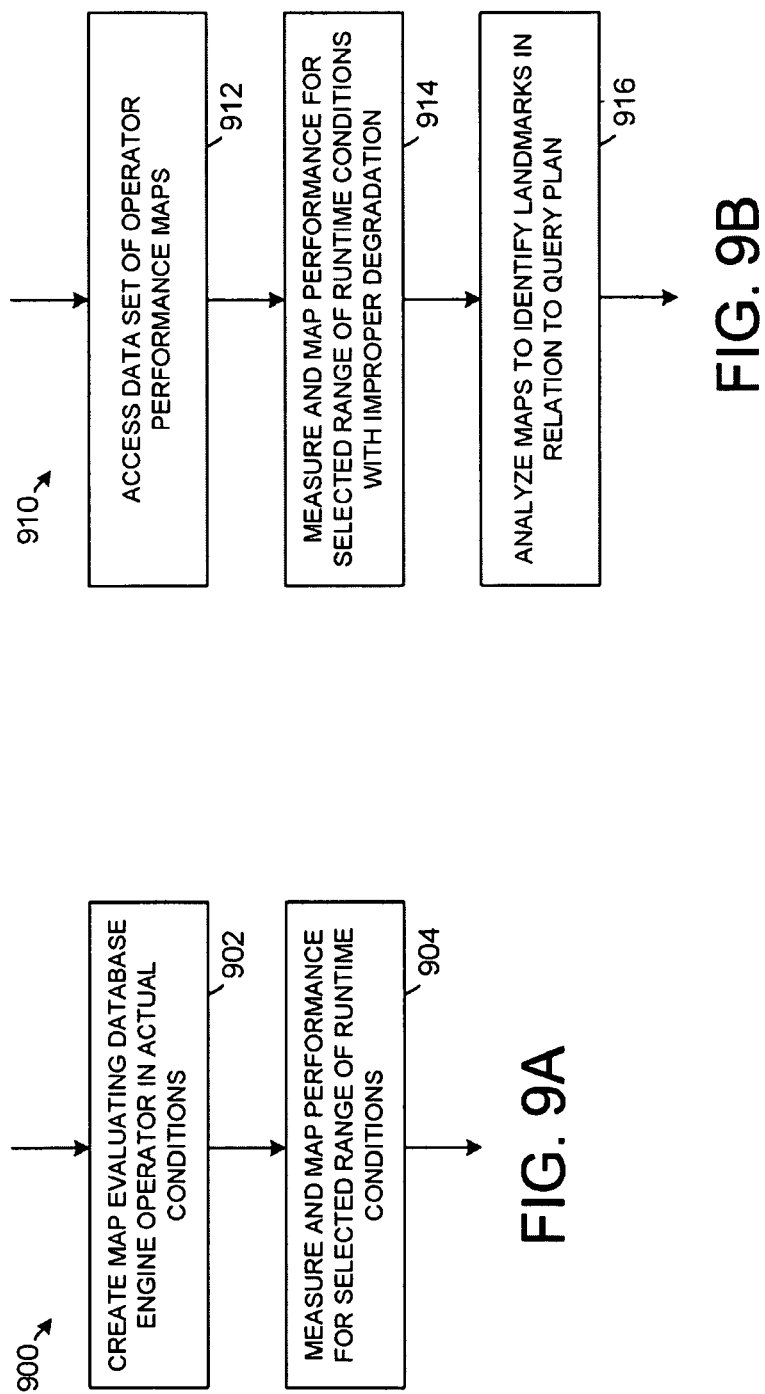
FIGS. 9A and 9B are flow charts illustrating one or more embodiments or aspects of a computer-executed method for managing queries in a database system.

Referring to FIGS. 9A and 9B, flow charts illustrate one or more embodiments or aspects of a computer-executed method for managing queries in a database system. FIG. 9A depicts a computer-executed method 900 for processing data including evaluating database query plan robustness landmarks. An illustrative method 900 comprises creating 902 a performance map that evaluates performance of an implementation of a database engine operator during execution under actual conditions, and measuring and mapping 904 performance for a selected range of runtime conditions comprising data characteristics or a combination of resource availability and data characteristics.

Referring to FIG. 9B, another embodiment or aspect of method for evaluating 910 database query plan robustness landmarks can further comprise accessing 912 at least one performance map created by acquisition during execution of an implementation of a database engine operator under actual conditions, and measuring and mapping 914 performance for a selected range of runtime conditions to identify regions under which performance of a selected operator implementation degrades in a manner different from a predetermined proper manner. The method 910 can further comprise analyzing 916 the maps to identify landmarks in relation to a query plan wherein query performance degrades in a predetermined manner.

Figure 10:
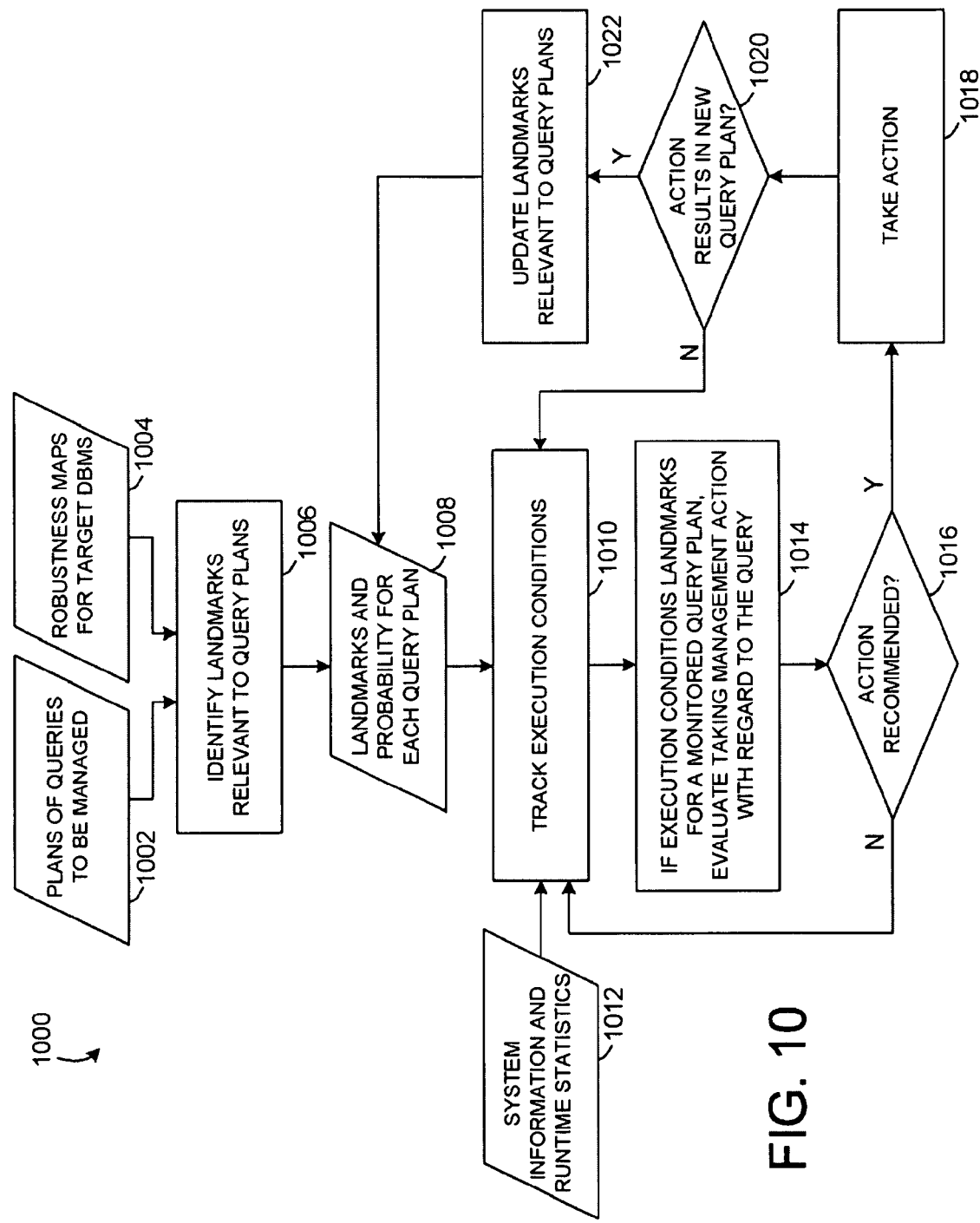
FIG. 10 is a schematic flow chart showing an embodiment of method for using robustness maps to evaluate how changing conditions (resource availability, cardinality, and others) can impact performance.

Referring to FIG. 10, a schematic flow chart illustrates an embodiment of method 1000 for using robustness maps to evaluate how changing conditions (resource availability, cardinality, and others) can impact performance. For example, FIG. 10 defines an action flow showing monitoring of execution of multiple queries by a workload management system. Given a set 1002 of plans of queries to be monitored, as well as robustness maps 1004 associated with the target database system, a list of the potential landmarks (features on the maps indicating conditions that could cause performance to suddenly degrade) relevant to or associated with each query plan can be extracted and identified 1006. The robustness maps 1004 can include coordinates of "danger zone landmarks" in terms of an operator's cardinality, resource conditions, and/or performance for the target database management system. The landmarks and probability or risk of conditions being met for each query plan can be stored 1008.

Execution of the running queries in then monitored 1010, for example by periodically acquiring runtime statistics. The query execution conditions that can be tracked or monitored 1010 can include actual resource availability, cardinality conditions, and the like wherein the actual location of a selected condition can be tracked on performance maps. The executing queries can be tracked 1010 by monitoring the stored landmarks and risk conditions 1008 and system information and runtime statistics 1012. Monitoring 1010 of the executing queries can include one or more of several actions including: (1) characterizing the range and trends of current operating conditions; (2) identifying relevant "robustness" landmarks that fall into the current range of operating conditions (conditions under which the performance is known to degrade less than gracefully); (3) identifying "robustness" landmarks that are likely to be encountered if current trends persist, for example if available memory has been steadily decreasing; (4) deciding whether corrective action is merited; (5) if corrective action is recommended, then take the action; (6) if the action results in a new query plan (for example, if the action were to cancel one of the queries and then submit the query with a different plan), then updating the list of landmarks to be monitored; and the like.

If execution conditions approach landmarks associated with any monitored query plan, whether a management action should be taken with regard to that query is evaluated 1014. If action is recommended 1016, then the action is taken 1018.

Many different potential corrective actions can be taken 1018. For example, the system can admit, reject, or re-optimize a query based on whether execution of the query under current conditions is likely to suffer from suddenly degradation of performance. The system can schedule a query to run when resource availability conditions are likely to be favorable. The system can cancel and possibly re-optimize and re-submit an executing query if resource availability conditions are headed towards an area on a map that has been identified as containing a robustness problem. The system can act to reduce system load if resource availability conditions are not conducive to the current workload. The system can perform scheduling actions by using robustness maps to identify resource requirements and thereby avoid co-running queries with conflicting resource needs. The system can raise an alarm if a query enters the proximity of a "robustness landmark". In addition, the workload management system can produce an analysis of the progress of an executing query by locating query performance on robustness maps, for example noting current trends in runtime conditions and the executing query's proximity to any robustness landmarks. Other corrective actions are also possible.

If the action results in a new query plan 1020, landmarks relevant to the monitored query plans are updated 1022, and stored 1008. Tracking 1010 of execution conditions continues.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented system comprising:
a processor;
a computer-readable data storage medium to store computer-readable program code that is executable by the processor to implement logic,
wherein the logic creates a performance map evaluating performance of an implementation of a database engine operator or query plan during execution under actual conditions, the logic measuring and mapping performance for a selected range of runtime conditions comprising data characteristics,
wherein the logic analyzes the maps to identify landmarks in relation to the database engine operator or the query plan in which performance degrades in a predetermined manner.

2. The system according to claim 1 further comprising:
a set of operator implementations or query plans to be evaluated;
a set of runtime resource conditions to be evaluated;
a set of data characteristics; and
the logic invoking operators or query plans and measuring a plurality of performance characteristics for selected operator implementations or query plans and selected runtime resource conditions at a plurality of data characteristics, the logic creating a set of performance measurements for the selected operator implementations or query plans and selected runtime conditions.

3. The system according to claim 2 further comprising:
the logic identifying regions in at least one performance map for which performance of an operator or query plan degrades more than a selected amount, the logic collecting the identified regions, identifying coordinates in the arrangement of the identified regions as the landmarks, and creating at least one performance map that include the identified regions and coordinates.

4. The system according to claim 3 further comprising:
the logic that accesses the at least one performance map to identify regions under which performance of a selected operator implementation degrades in a manner different from a predetermined proper manner, the logic analyzing the maps to identify landmarks in relation to the query plan wherein query performance degrades in a predetermined manner.

5. The system according to claim 3 further comprising:
a query plan;
a set of system configuration and contention information;
a set of information quantifying risk of encountering error in cardinality estimation during usage of database operators; and
the logic accessing, for nodes in the query plan, expected conditions from the set of system configuration and contention information, the logic calculating data characteristics for the expected conditions and risk.

6. The system according to claim 5 further comprising:
the logic that looks up landmarks from the at least one performance map in a range of conditions and data characteristics in the set of system configuration and contention information, and creates a landmark set comprising landmarks and probability of complying with the conditions.

7. The system according to claim 1 wherein:
the logic creates the map evaluating performance of an implementation of the database engine operator and analyzes the map to identify the landmarks in relation to the query plan based on evaluation of database operators in actual performance measurements acquired over multiple runtime conditions.

8. The system according to claim 1 further comprising:
the logic that creates the map evaluating performance of an implementation of the database engine operator and analyzes the map to identify the landmarks in relation to the query plan based on performance tests of individual operators under data characteristics and predefined resource availability conditions, evaluation of performance across a selected variety of conditions considering performance as a continuous function across the variety of conditions.

9. The system according to claim 1 further comprising:
an article of manufacture comprising:
a controller-usable medium having a computer readable program code embodied in a controller for evaluating database query plan robustness landmarks, the computer readable program code further comprising:
code causing the controller to create the performance map evaluating performance of an implementation of the database engine operator during execution under actual conditions; and
code causing the controller to measure and map performance for a selected range of runtime conditions comprising data characteristics.

10. A computer-implemented system comprising:
a processor;
a computer-readable data storage medium to store computer-readable program code that is executable by the processor to implement logic,
wherein the logic accesses at least one performance map created by acquisition during execution of an implementation of a database engine operator under actual conditions, the logic measuring and mapping performance for a selected range of runtime conditions to identify regions under which performance of a selected operator implementation degrades in a manner different from a predetermined proper manner, the logic analyzing the maps to identify landmarks in relation to a selected query plan wherein query performance degrades in a predetermined manner.

11. The system according to claim 10 further comprising:
a query plan;
a set of system configuration and contention information;
a set of information quantifying risk of encountering error in cardinality estimation during usage of database operators; and
the logic accessing, for nodes in the query plan, expected conditions from the set of system configuration and contention information, the logic calculating data characteristics for the expected conditions and risk.

12. The system according to claim 11 further comprising:
the logic that looks up landmarks from the at least one performance map in a range of conditions and data characteristics specified in the set of system configuration and contention information, and creates a landmark set comprising landmarks and probability of complying with the conditions.

13. The system according to claim 10 further comprising:
an article of manufacture comprising:
a controller-usable medium having a computer readable program code embodied in a controller for evaluating database query plan robustness landmarks, the computer readable program code further comprising:
code causing the controller to access at least one performance map created by acquisition during execution of an implementation of a database engine operator under actual conditions;
code causing the controller to measure and map performance for a selected range of runtime conditions to identify regions under which performance of a selected operator implementation degrades in a manner different from a predetermined proper manner; and
code causing the controller to analyze the maps to identify landmarks in relation to a selected query plan wherein query performance degrades in a predetermined manner.

14. A computer-executed method of processing data comprising:
evaluating database query plan robustness landmarks, by a processor, comprising:
creating a performance map evaluating performance of an implementation of a database engine operator during execution under actual conditions, by the processor;
measuring and mapping performance for a selected range of runtime conditions comprising data characteristics,
analyzing the performance map to identify landmarks in relation to the database engine operator in which performance degrades in a predetermined manner, by the processor.

15. The method according to claim 14 further comprising:
evaluating database query plan robustness landmarks further comprising:
accessing at least one performance map created by acquisition during execution of an implementation of a database engine operator under actual conditions; and
measuring and mapping performance for a selected range of runtime conditions to identify regions under which performance of a selected operator implementation degrades in a manner different from a predetermined proper manner.

* * * * *

UNITED STATES PATENT AND TRADEMARK OFFICE
CERTIFICATE OF CORRECTION

PATENT NO. : 9,177,023 B2  
APPLICATION NO. : 12/364063  
DATED : November 3, 2015  
INVENTOR(S) : Goetz Graefe et al.

Page 1 of 1

It is certified that error appears in the above-identified patent and that said Letters Patent is hereby corrected as shown below:

Claims

In column 20, line 39 approx., in Claim 14, delete "characteristics," and insert -- characteristics, by the processor; and --, therefor.

Signed and Sealed this  
Twenty-second Day of March, 2016

Michelle K. Lee  
*Director of the United States Patent and Trademark Office*